US007028861B2

(12) United States Patent
Sayers et al.

(10) Patent No.: US 7,028,861 B2
(45) Date of Patent: Apr. 18, 2006

(54) ELECTRONICALLY KEYED DISPENSING SYSTEMS AND RELATED METHODS OF INSTALLATION AND USE

(75) Inventors: Richard C. Sayers, Akron, OH (US); Shane Obitts, Elyria, OH (US); William A. Hudgins, Stow, OH (US); Paul Waterhouse, Hamilton (CA); Michael J. Dolan, Akron, OH (US); Spencer W. Allen, Wexford, PA (US); R. Victor Sulkowski, Houston, PA (US)

(73) Assignee: Joseph S. Kanfer, Richfield, OH (US)

( * ) Notice: Subject to any disclaimer, the term of this patent is extended or adjusted under 35 U.S.C. 154(b) by 0 days.

(21) Appl. No.: 10/737,869

(22) Filed: Dec. 16, 2003

(65) Prior Publication Data

US 2005/0127090 A1 Jun. 16, 2005

(51) Int. Cl.
*G01F 11/00* (2006.01)

(52) U.S. Cl. ............................ 222/1; 222/63; 222/105; 222/153.03; 222/181.3; 222/333

(58) Field of Classification Search .................... 222/1, 222/63, 105, 153.01, 153.03, 153.13, 181.3, 222/333, 383.1
See application file for complete search history.

(56) References Cited

U.S. PATENT DOCUMENTS 4,126,341 A 11/1978 Bradstock
4,142,674 A 3/1979 Walton
4,366,481 A 12/1982 Main et al.
4,369,481 A 1/1983 Early
4,372,590 A 2/1983 Pilat et al.
4,390,758 A 6/1983 Hendrickson
4,471,905 A 9/1984 Sloma et al.
4,489,359 A 12/1984 Suzuki
4,534,194 A 8/1985 Aydin
4,580,721 A 4/1986 Coffee et al.
4,602,150 A 7/1986 Nishikawa et al.
4,629,164 A 12/1986 Sommerville
4,656,850 A 4/1987 Tabata
4,697,171 A 9/1987 Suh
4,722,372 A 2/1988 Hoffman et al.
4,770,012 A 9/1988 Johansson et al.
4,779,090 A 10/1988 Micznik et al.
4,798,068 A 1/1989 Nakauchi
4,843,851 A 7/1989 Frolov
4,849,749 A 7/1989 Fukamachi et al.

(Continued)

*Primary Examiner*—Joseph A. Kaufman
(74) *Attorney, Agent, or Firm*—Renner Kenner Greive Bobak Taylor & Weber

(57) ABSTRACT

Dispensing systems are disclosed which utilize electronically powered key devices and/or identification codes associated with a refill container to preclude the need for mechanical keys. A first embodiment of the device utilizes a matching code stored in a radio frequency identification tag or bar code associated with a fluid refill container and an identification code associated with the dispenser housing. Matching of the codes by a controller allows for continued use of the dispenser via some type of operational mechanism. Another embodiment employs a key which carries the matching code wherein matching of the codes allows for actuation of a motor actuated pumping device. Yet another embodiment employs a blocking mechanism to prevent use of a dispenser's push bar if a key and dispenser housing do not have matching codes. And yet another embodiment requires the use of a key that has a matching code that matches the dispenser's identification code in order to permit initial access to the dispenser housing.

63 Claims, 17 Drawing Sheets

U.S. PATENT DOCUMENTS 4,902,882 A 2/1990 Lavelle
4,911,331 A 3/1990 Sedam
4,931,789 A 6/1990 Pinnow
4,967,577 A 11/1990 Gartner et al.
4,967,935 A 11/1990 Celest
5,031,797 A 7/1991 Boris et al.
5,083,113 A 1/1992 Slawinski et al.
5,100,030 A * 3/1992 Roggenburg et al. .... 222/181.2
5,111,186 A 5/1992 Narlow et al.
5,111,927 A 5/1992 Schulze, Jr.
5,228,598 A 7/1993 Bally et al.
5,337,588 A 8/1994 Chhwatwal
5,339,662 A 8/1994 Goldman
5,345,379 A 9/1994 Brous et al.
5,359,322 A 10/1994 Murray
5,385,039 A 1/1995 Feldpausch et al.
5,412,372 A 5/1995 Parkhurst et al.
5,442,348 A 8/1995 Mushell
5,541,581 A 7/1996 Trent
5,550,529 A 8/1996 Burge
5,579,888 A 12/1996 Slyper
5,625,659 A 4/1997 Sears
5,635,917 A 6/1997 Todman
5,681,070 A 10/1997 Williams et al.
5,691,711 A 11/1997 Jorgensen
5,718,135 A 2/1998 Bertenshaw et al.
5,738,153 A 4/1998 Gerling et al.
5,771,722 A 6/1998 DiVito et al.
5,782,814 A 7/1998 Brown et al.
5,839,305 A 11/1998 Aston
5,842,603 A 12/1998 Schroeder et al.
5,875,921 A 3/1999 Osgar et al.
5,907,493 A 5/1999 Boyer et al.
5,957,328 A 9/1999 Osgar
5,997,928 A 12/1999 Kaish et al.
6,005,487 A 12/1999 Hyatt, Jr. et al.
6,036,056 A * 3/2000 Lee et al. ..................... 222/63
6,038,896 A 3/2000 Chamberlain et al.
6,047,807 A 4/2000 Molbak
6,070,761 A 6/2000 Bloom et al.
6,082,153 A 7/2000 Schoell et al.
6,085,560 A 7/2000 Dalton, Jr.
6,181,025 B1 1/2001 McConnell et al.
6,275,143 B1 8/2001 Stobbe
6,304,169 B1 10/2001 Blama et al.
6,384,711 B1 5/2002 Cregger et al.
6,385,505 B1 5/2002 Lipps
6,390,329 B1 5/2002 Maddox
6,422,422 B1 7/2002 Forbes
6,427,504 B1 8/2002 Janssen et al.
6,431,400 B1 8/2002 O'Maley et al.
6,442,986 B1 9/2002 Russel et al.
6,471,089 B1 10/2002 Liff et al.
6,474,122 B1 11/2002 Davis
6,483,424 B1 11/2002 Bianco
6,600,406 B1 7/2003 Ha
6,626,355 B1 9/2003 Sasse et al.
6,649,829 B1 11/2003 Garber et al.
6,693,540 B1 2/2004 Gershenfeld et al.
2001/0020148 A1 * 9/2001 Sasse et al. ................... 604/65
2002/0014950 A1 2/2002 Ayala et al.
2002/0155033 A1 10/2002 Strand et al.
2003/0193398 A1 10/2003 Geber et al.
2004/0104241 A1 * 6/2004 Broussard et al. .......... 221/289

* cited by examiner

ELECTRONICALLY KEYED DISPENSING SYSTEMS AND RELATED METHODS OF INSTALLATION AND USE

TECHNICAL FIELD

The present invention is generally directed to dispensing systems. In particular, the present invention is directed to keyed dispensers which allow only certain types of material to be installed in selected dispensers and, if desired, installed by selected distributors. More specifically, the present invention is directed to electronically keyed fluid dispensers.

BACKGROUND ART

It is well known to provide fluid dispensers for use in restaurants, factories, hospitals, bathrooms and the home. These dispensers may contain fluids such as soap, anti-bacterial cleansers, disinfectants, lotions and the like. It is also known to provide dispensers with some type of pump actuation mechanism wherein the user pushes or pulls a lever to dispense a quantity of fluid into the user's hands. "Hands-free" dispensers may also be utilized wherein the user simply places their hand underneath a sensor and a quantity of fluid is dispensed. Related types of dispensers may be used to dispense powder or aerosol materials.

Dispensers may directly hold a quantity of fluid, but these have been found to be messy and difficult to service. As such, it is known to use refill bags or containers that hold a quantity of fluid and provide a pump and nozzle mechanism. These refill bags are advantageous in that they are easily installed without a mess. And the dispenser can monitor usage to indicate when the refill bag is low and provide other dispenser status information.

Manufacturers of these fluid materials enlist distributors to install the dispensers at various locations and place the manufacturer's products in the dispensers. Further, the manufacturers rely on the distributors to put the correct refill container in the dispenser housing. For example, it would be very upsetting to hospital personnel to have hand moisturizing lotion dispensed when they instead desire anti-bacterial soap. Therefore, manufacturers provide keyed nozzle and pump mechanisms for each type of fluid refill bag so that only appropriate refill bags are installed in corresponding fluid dispensers.

Distributors prefer such a keying system so that their dispensers can only be refilled by them instead of their competitors. Replacement of refill containers by unauthorized distributors is sometimes referred to as "stuffing." In addition to providing keying between the dispenser and the fluid refill bag to ensure the compatibility of the product with the dispenser, keying is used to ensure that competitors of the distributor do not obtain the distributor's business. And it is also critical to the manufacturer that competitors do not stuff their product into the manufacturer's dispensers. Such activity prevents the manufacturer from obtaining an adequate return on the dispensers which are typically sold at cost or less.

Although mechanical keys are helpful in ensuring that the proper refill bag is installed into the proper dispenser and that the distributors maintain their business clientele, these keying systems have been found to be lacking. For example, if a distributor's competitor cannot install their refill packages into the distributor's dispenser device, the competitor may remove or alter the keying mechanism. As such, inferior fluid may be installed into a particular dispenser and the preferred distributor will lose sales. Mechanical keying also necessitates significant tooling costs underwritten by the manufacturer to design special nozzles and dispensers that are compatible with one another. In other words, each dispenser must be keyed for a particular product, a particular distributor and perhaps even a particular location. Accordingly, the inventory costs for maintaining refill bags with a particular key is significant. And the lead time for manufacturing such a refill bag may be quite lengthy. Moreover, the particular identification of a particular keying device may be lost or damaged so that it is difficult to determine which type of keying configuration is needed for the refill bags.

One attempt at controlling the type of product associated with a dispenser is disclosed in U.S. Pat. No. 6,431,400 B1. This patent discloses a refill bag that utilizes a wafer with an embedded magnet that must be properly oriented into a housing in order for the magnet to be detected and effectively close an on/off switch. If the magnet is not detected then the dispenser is disabled. Although effective in its' stated purpose, the device disclosed in the patent is lacking in that a specific orientation is required for installation of the refill container.

Therefore, there is a need in the art for a dispensing system which provides for exchanges of data between a refill container and a receiving housing regardless of the container's orientation. The exchange of data enables an improved keying system that eliminates the significant tooling costs required for each new distributor and for each new product that is required to be associated with a dispenser. There is also a need for an improved keying system for fluid dispensers to ensure that the proper material is installed into the proper dispenser. And there is a need to control the number of refill bags shipped to a distributor to ensure that the distributor is utilizing the proper refill materials.

SUMMARY OF THE INVENTION

In view of the foregoing it is a first aspect of the present invention to provide electronically keyed dispensing systems and related methods of installation and use.

Another object of the present invention, which shall become apparent as the detailed description proceeds, is achieved by a dispensing system comprising a housing having a first data communication device associated therewith; a refill container carrying a material and having a second data communication device associated therewith, the refill container receivable in the housing; an operational mechanism associated with one of the housing and the refill container to enable dispensing of the material; and a controller in communication with the first and second data communication devices to facilitate sharing of data therebetween and to selectively enable the operational mechanism.

Other aspects of the present invention are attained by a method for installing a refill container in a dispenser, comprising associating a first data communication device with a housing; associating a second data communication device with a refill container which is receivable in the housing; associating an operational mechanism with one of the housing and the refill container; controlling communications between the first and second data communication devices; and selectively enabling the operational mechanism as a result of the controlling step.

These and other objects of the present invention, as well as the advantages thereof over existing prior art forms, which will become apparent from the description to follow, are accomplished by the improvements hereinafter described and claimed.

BRIEF DESCRIPTION OF THE DRAWINGS

For a complete understanding of the objects, techniques and structure of the invention, reference should be made to the following detailed description and accompanying drawings, wherein.

BEST MODE FOR CARRYING OUT THE INVENTION

Figure 1:
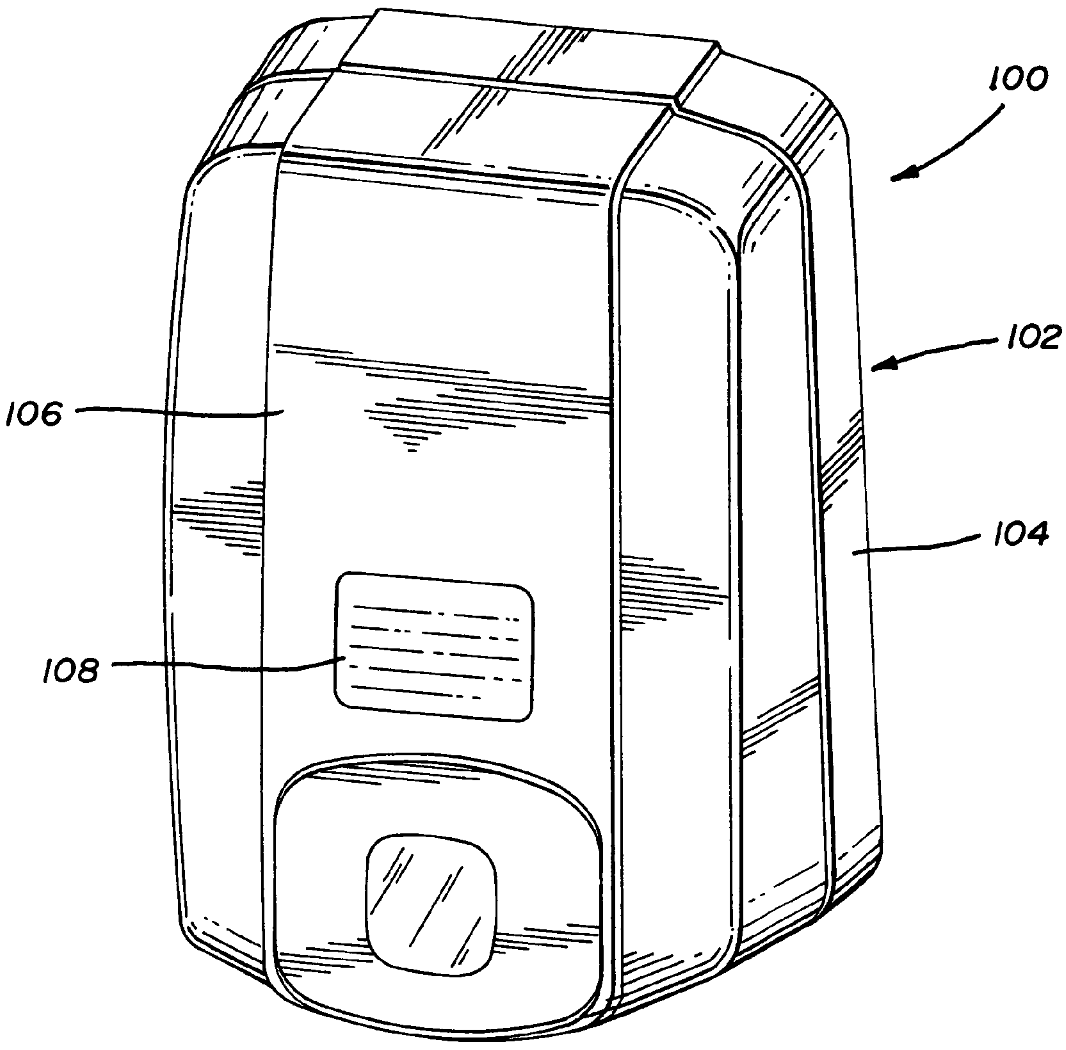
FIG. 1 is a front perspective view of a fluid dispenser housing made in accordance with the concepts of the present invention.

It will be appreciated from a reading of the Background Art that a primary need for dispensing systems is the ability to prevent "stuffing" of competitor's refill containers in a manufacturer's dispenser or in dispensers serviced by a distributor authorized by the manufacturer. The exemplary systems disclosed herein fill this need by facilitating sharing of data between a communication device associated with the refill container and a communication device associated with the dispenser housing. Sharing of data includes, but is not limited to: the type of material within a refill container; a refill container's identification code; a concentration ratio within the refill container; a distributor's identification code; quality control information, such as manufacture dates and lot size; pump and/or nozzle size; the type of pump actuating mechanism associated with a dispenser; the type of dispenser location—restaurant, hospital school, factory, etc—; the dispenser's history of use; and so on. The communication devices referred to may include, but are not limited to: a bar code; a magnetic storage medium; an optical storage medium; radio frequency identification (RF ID) tags or smart labels; and related mediums. It is envisioned that the RF ID tags will be the preferred communication device and these include chip devices that use electric, inductive or capacitive antennas; or chipless devices that utilize microwave reflectors, remote magnetics, transistors or transistorless circuits. And the communication devices, whichever mode is selected, provide the ability to change, update and lock data stored in the devices.

A microprocessor based controller, which may be associated with either the refill container, the housing or a stand-alone device, is preferably used to facilitate the sharing of data between the communication devices. And based upon the monitoring of the communication devices undertaken by the controller, the controller controls any number of operational mechanisms that permit use of the dispensing system. The controller may also allow a single dispenser to receive and dispense materials from more than one refill container, or allow control of more than one dispenser.

The stand-alone device may be an electronic plug or key that is receivable by the dispenser housing. Indeed the key may or may not provide: a power supply, the first or second communications device, and the controller. The foregoing features and options may be selected depending upon security features desired by the distributor or manufacturer as deemed appropriate.

The dispensers disclosed herein either utilize operational mechanisms such as a push bar mechanism or a "hands-free" mechanism for dispensing a quantity of fluid. The push bar mechanism operates by the user pushing a bar that actuates a pump mechanism carried by the refill container to dispense a measured quantity of fluid. The "hands-free" device, an example of which is disclosed in U.S. Pat. No. 6,390,329, and which is incorporated herein by reference, utilizes a sensor that detects the presence of an individual's hand and then dispenses a measured quantity of fluid. The operational mechanism may also include any latching components that permit access to the housing that carries the refill container. In other words, a latch or a series of latches may be used to prevent access to the refill container. If so, then the dispensing system may not be enabled if the controller prevents unlocking of the latch mechanism. Or the controller may be operative with a mechanism that controls a pump associated with the refill container, wherein incompatibility of the communication devices may preclude actuation of the pump.

In order to operate the hands-free dispenser and other dispensers that provide status information it is known to provide a power source, such as low-voltage batteries, within the fluid dispenser housing. Accordingly, the batteries contained within the fluid dispenser may be utilized to operate the controller and a display of a particular dispenser. In other words, the internal power may be utilized to read the communication device provided with the key or the refill container. In the alternative, and as noted previously, the power may be externally provided by the electronic key inserted into the dispenser. This feature saves on providing a power supply with each dispenser and the costs associated with replacing discharged batteries.

The features listed above provide for a dispensing system with significantly improved operational features. Indeed, use of the communication devices and their exchange of information facilitated by the controller provide for not only selective enablement of the system but also monitoring of the system. By collecting additional system information, the needs of the dispenser user, the distributor and the manufacturer can be met. For example, the dispensers frequency of use can be determined along with peak hours of operation, use within designated time periods and so on. As will be appreciated from the detailed discussion to follow, the various features of the different embodiments may be utilized in any number of combinations and with one or multiple dispensers. Accordingly, reference is made to the following detailed description and figures which set out the particular embodiments.

Fluid Dispensing System Utilizing an Internal Electronic Key, an Electronic Lockout System and Internal Power Referring now to the drawings and in particular to FIGS. 1–5, it can be seen that a dispensing system according to the present invention is designated generally by the numeral 100. The system 100 and all dispensing systems disclosed herein are preferably used for the dispensing of fluid materials. But the systems may also be used to dispense powder, pellets or aerosol type materials. The dispensing system 100 includes a housing 102 which has a back plate 104 that may be secured or mounted to a wall or column. Although the dispenser systems shown herein are preferably wall-mounted, it will be appreciated that the concepts of the present invention are applicable to any free-standing or otherwise mounted fluid dispensing device. A movable front cover 106 is coupled to the back plate 104 and may be latched and/or hinged to allow for removal of the front cover to permit access to components contained within the housing 102. An information display panel 108 may be provided on the cover 106. The panel 108 may provide illuminated indicators for advising the user that a battery is low, that fluid is low and/or to provide for programmable features of the dispensing device such as timers, counters and the like.

Figure 2A:
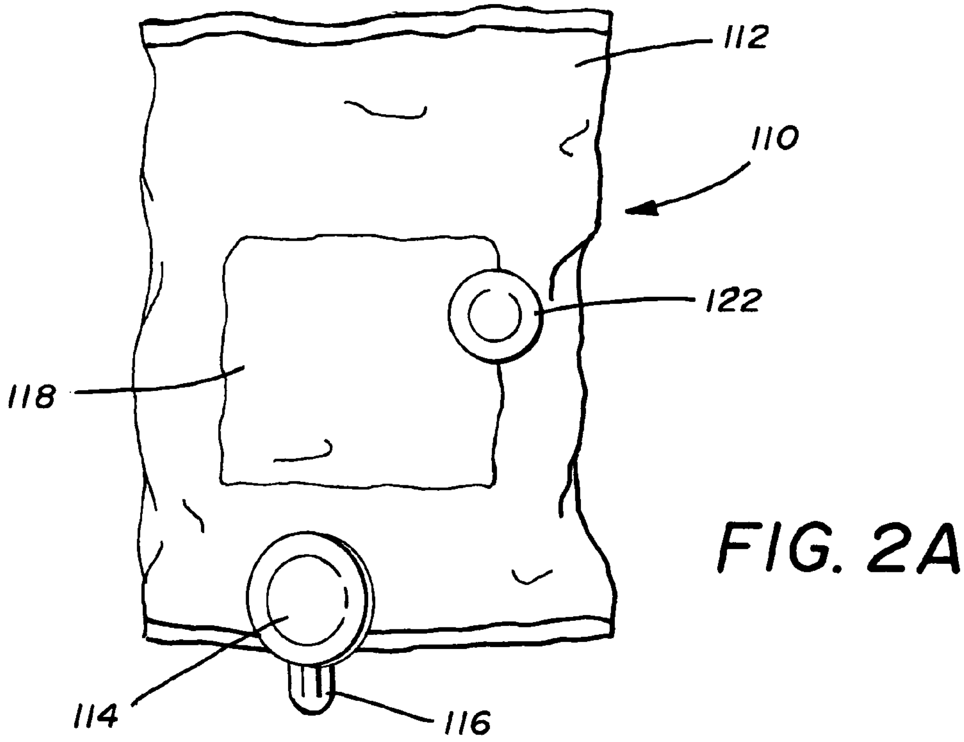
FIGS. 2A and 2B are front perspective views of refill containers with different identification devices.
Figure 2B:
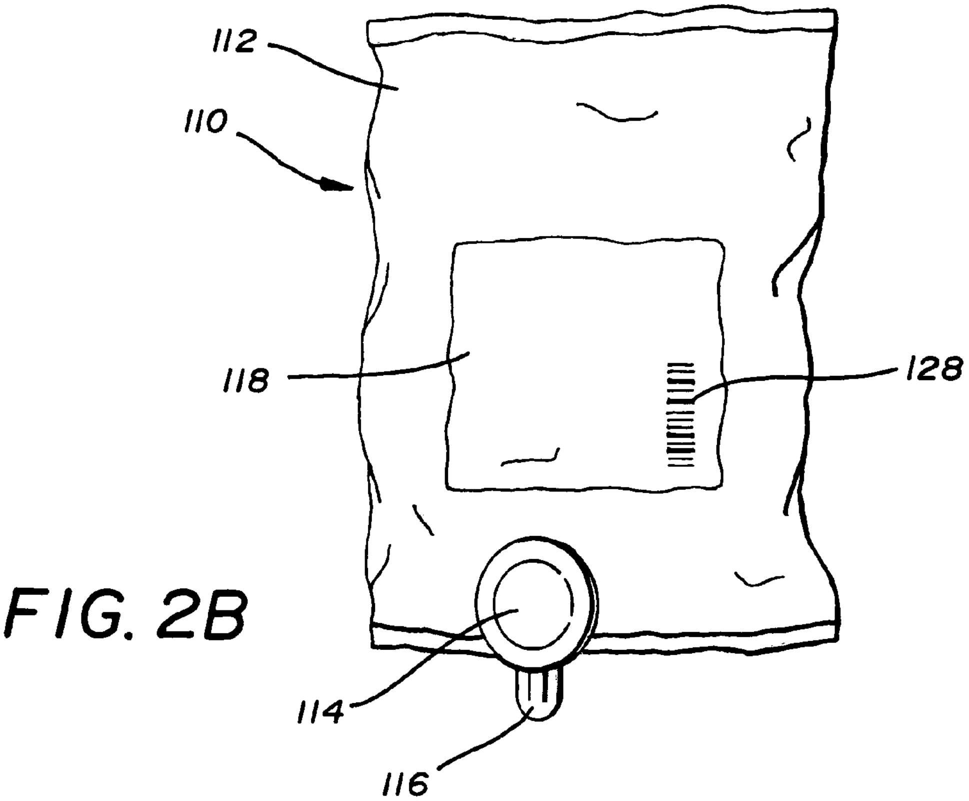

As best seen in FIG. 2A, a refill container or bag is designated generally by the numeral 110. The container 110 is typically a pliable, plastic material that is sealed upon receipt of the manufacturers' fluid material 112. Secured at a bottom end of the container 110 is a pump mechanism 114 from which extends a nozzle 116. As is well documented, the pump mechanism 114 may be a pump dome which upon depression opens the nozzle 116 and allows for a measured quantity of fluid to be dispensed. Indicia 118 may be disposed on any surface of the bag. The indicia 118 includes information about the fluid materials, ingredients, date of manufacture and other pertinent product information. In the present embodiment, a data communication device in the form of an electronic tag 122 is carried by or attached to the container 110. In the preferred embodiments, the tag is a radio frequency identification (RF ID) tag that may or may not incorporate an antenna. The tag may also include an electronic storage device that stores a "matching" identification code and may contain other relevant information regarding the material enclosed in the bag, the size of the pump, the volume of the fluid material and the like. It will further be appreciated that the tag 122 is stored with information and/or programmed at the manufacturer's facility and contains information that is not easily changed or erased except by the manufacturer. As seen in FIG. 2B, a bar code 128 which contains the "matching" code and the same type of information stored in the tag 122 may be used.

Figure 3:
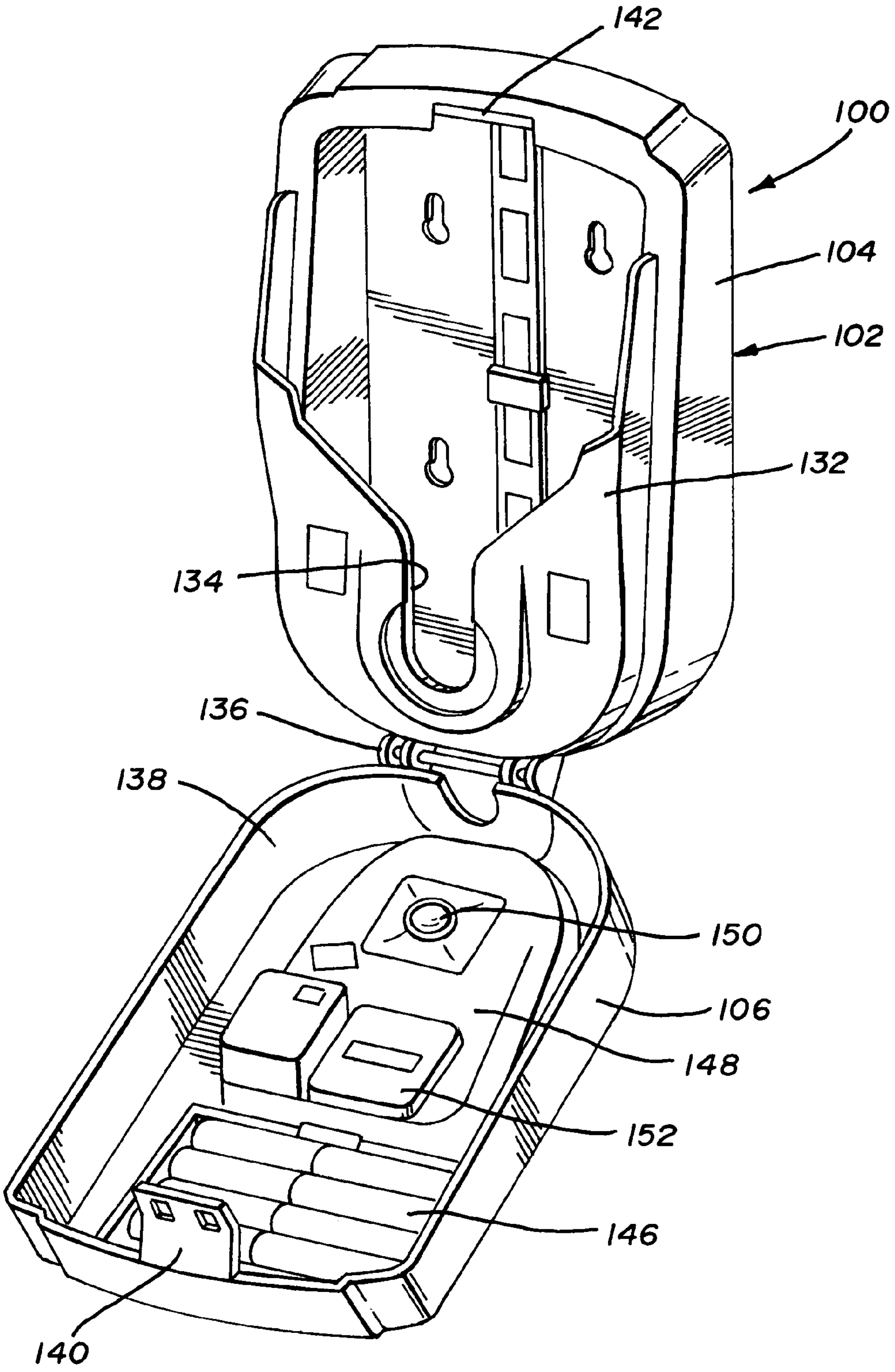
FIG. 3 is a front perspective view of an exemplary fluid dispenser housing with its' front cover in an open position.

Referring now to FIG. 3, it can be seen that the housing 102 includes a refill carrier 132. The carrier 132 is mounted on the back plate 104 and may function to hold the refill container 110 in a predetermined position. The carrier 132 provides a slot 134 which receives the pump mechanism 114 and nozzle 116 so as to provide structural support for the container and to ensure that the pump mechanism is properly contained. The refill carrier 132 may include a hinge 136 pivotable with respect to the back plate to allow for movement of the refill carrier 132 to facilitate insertion and withdrawal of the refill container 110.

The front cover 106 has a back side 138 that provides a latch 140 at a top side thereof that mates with a latch bar 142 extending from the back plate 104. It will be appreciated that the latch bar 142 may be manually or automatically actuated so as to allow for opening and closing movement of the front cover 106.

The back side 138 may carry a plurality of batteries 146 which are designated in the schematic drawings to follow as $V^+$. These batteries 146 provide the "internal" power for the fluid dispensers. In other words, in some of the embodiments disclosed herein, the electrical power is provided internally by batteries of appropriate voltage stored within the housing. Also mounted on the back side 138 is a motor housing 148 which contains a motor, gearing and a sensor for operation of a hands-free device. Briefly, the sensor detects the presence of an individual's hands near the nozzle 116 when the refill container is installed. The sensor then causes the motor contained within the motor housing to generate a rotational force that is transferred to a pump actuator 150. The pump actuator 150, when the front cover is closed, comes in contact with the pump mechanism 114 which then dispenses a measured quantity of fluid. Collectively, the foregoing components may be referred to as the operational mechanism.

Figure 4:
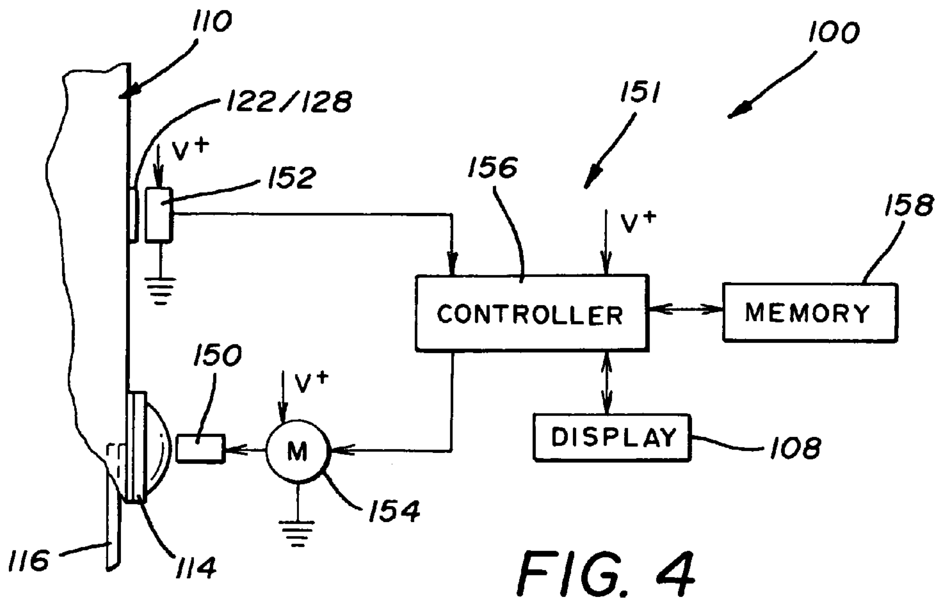
FIG. 4 is a schematic drawing of a first embodiment of a keyed fluid dispensing system.

As seen in FIG. 4, a communication system, designated generally by the numeral 151, is contained within the housing 102. The system 151 is typically part of the electronic components utilized to operate the other features of the dispenser, but the system 151 could be contained in a separate module. The system 151 includes a detector 152 which allows for communication with the tag 122 when the cover 106 is closed. In the alternative, it will be appreciated that the detector 152, may be able to detect a bar code and provide the similar information.

Another part of the system 151 is a controller 156 that receives and sends operational information to and from the communication device associated with the refill container and another communication device associated with the housing 102. The controller 156 contains the necessary hardware, software and memory devices for implementation of the operational features of the fluid dispensing system 100. In this regard, a memory device 158, which is part of the system 151, is connected to the controller 156 and as such the memory device contains a distributor "identification code" and other related information and this information remains stored in the memory device 158 even in the event of a power loss. The controller 156 may also communicate information to the display 108 for purposes related to the normal operation of the fluid dispenser but which may also be utilized to provide information regarding operation of the system 151 and identification codes associated with the distributor and/or the manufacturer. The identification code is stored or programmed into the memory 158 by the manufacturer. Ideally, only the manufacturer can store, change or erase information stored in the memory 158.

Accordingly, when the sensor of the hands-free device detects the presence of an individual's hand this information is transferred to the controller 156 that begins actuation of a motor 154 to energize the actuator 150 and dispense a measured quantity of fluid.

Briefly, when the container 110 is installed in the refill carrier 132 and the front cover is closed—although not required to be closed—the communication system 151 is energized and the detector 152 reads the matching code. The controller 156 then compares the matching code with the identification code. If the codes match then the dispenser 100 proceeds with normal operation. If the codes do not match, then the controller 156 and the dispenser shuts down until the communication system is reset. This may be done by installing a different container 110 that has a proper matching code or by some other means.

Figure 5:
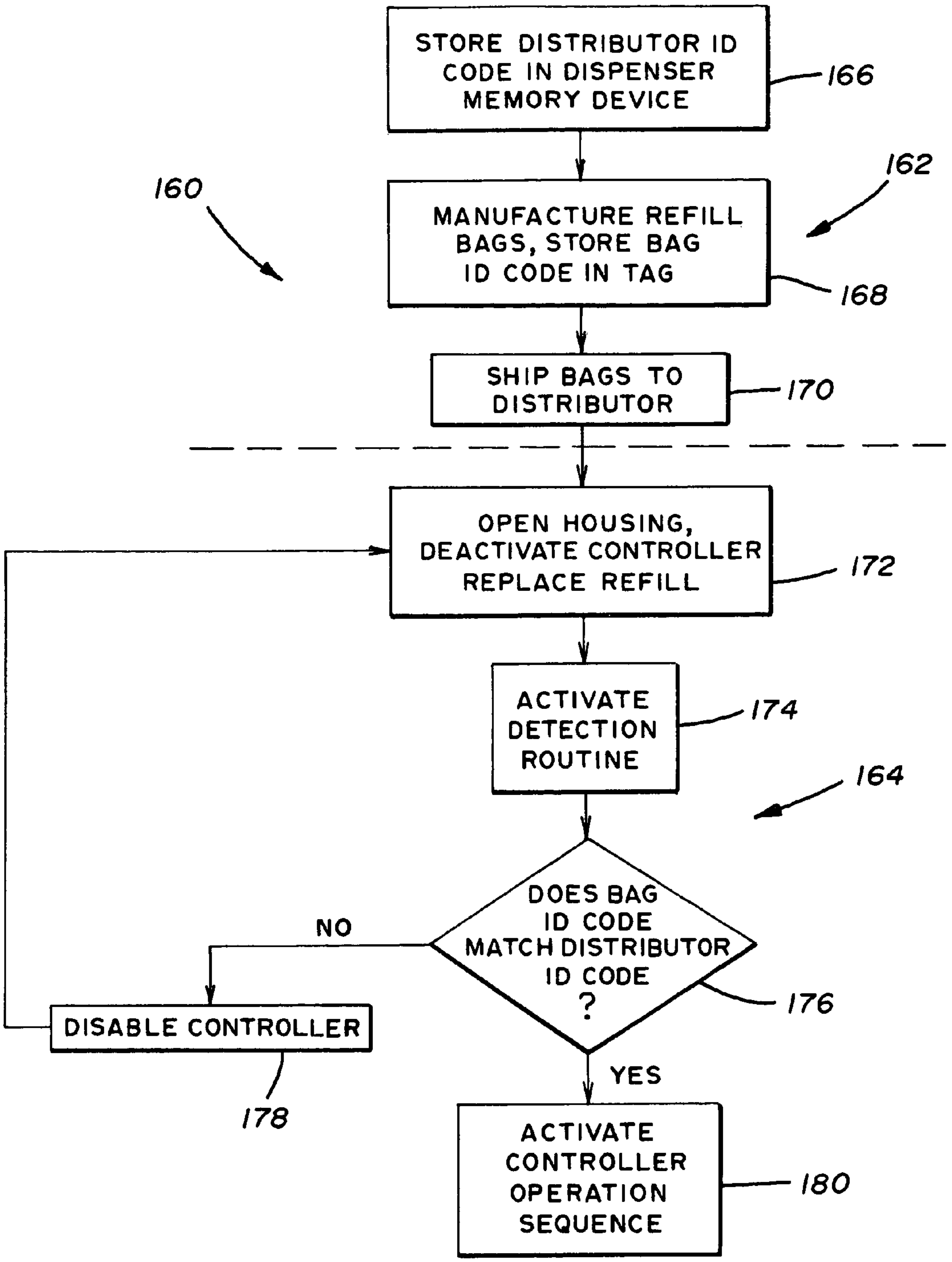
FIG. 5 is an operational flow chart of the fluid dispenser shown in FIG. 4.
Figure 6:
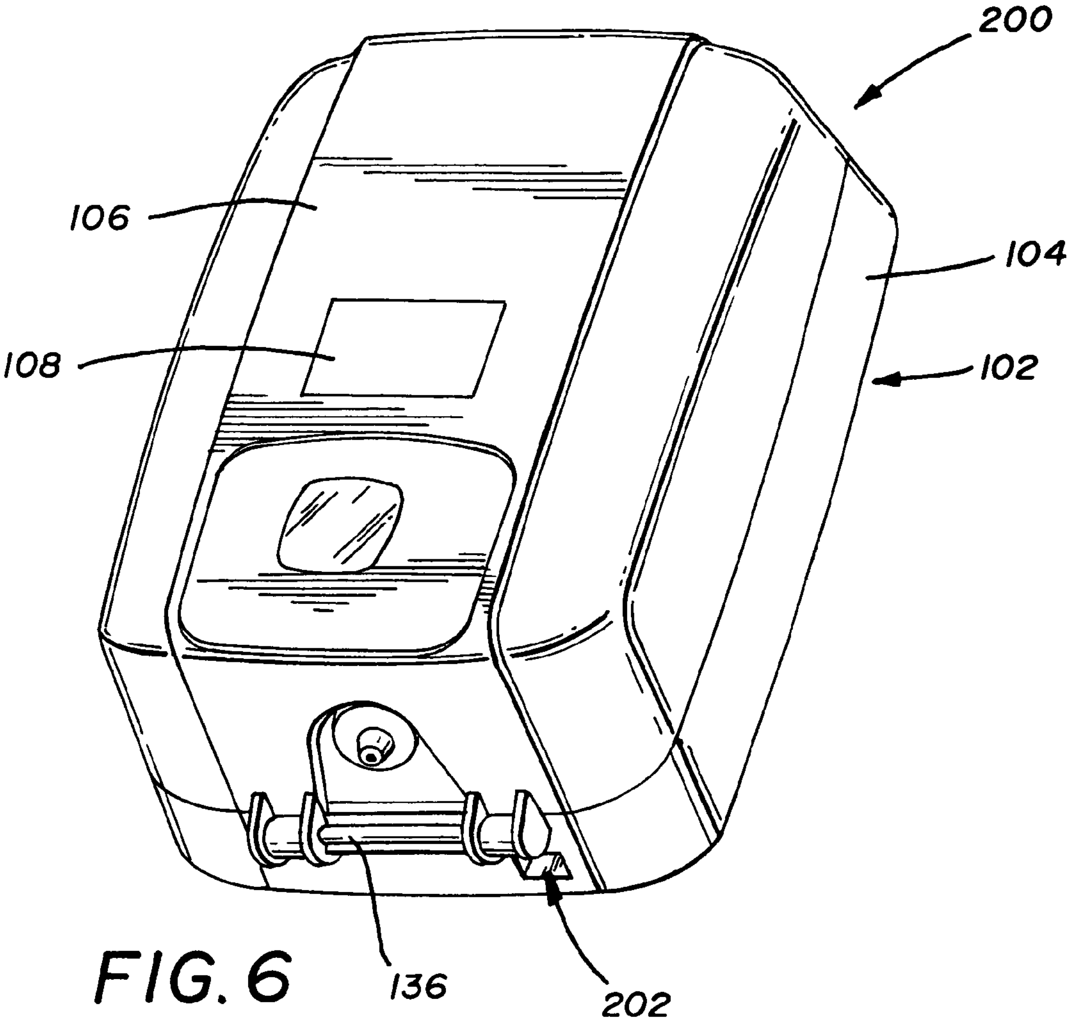
FIG. 6 is a front bottom perspective view of a fluid dispenser with its' cover closed.
Figure 7:
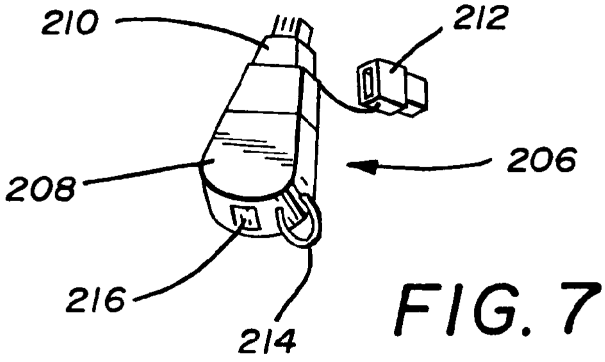
FIG. 7 is a perspective view of an electronic key made in accordance with the concepts of the present invention.

Referring now to FIG. 5 it can be seen that an operational flow chart for the fluid dispenser 100 is designated generally by the numeral 160. The operational steps of the fluid dispenser are separable into two series of steps. The first series of steps is designated generally by the numeral 162 and are directed to the manufacturing steps for the dispenser and the container undertaken by the manufacturer. The second series of steps is designated generally by the numeral 164 and these steps are typically performed by the distributor who installs the dispensing device and replaces the refill containers when they are depleted.

The manufacturing steps 162 include a first step 166 wherein the manufacturer of the dispensing device stores a distributor identification code in the dispenser memory device 158. Dispensers are shipped to the distributor with or without the refill containers. In any event, at step 168 the manufacturer manufactures the refill container and stores a container matching code in the tag 122. In the alternative, the information may be stored in a bar code or other electronically readable storage device. At step 170 the refill containers are shipped to a pre-designated distributor.

Upon receipt of the refill containers, the distributor at step 172, opens the dispenser housing 102 in a pre-determined manner. This step may deactivate the controller 156. The distributor then removes the empty refill container 110 and replaces it with a full refill container in the appropriate position. This activates a detection routine 174 carried out by the communication system 151 inasmuch as the tag 122 passes in close proximity to the code detector 152 which energizes the confirmation system 151 and the controller 156. At step 176, the controller 156 accesses and/or retrieves the matching code from the tag and compares it to the distributor identification code stored in the memory device 158. If the controller 156 determines that the bag's "matching" identification code does not match the distributor identification code, then, at step 178 the controller 156 disables the operational mechanism of the system 100 at step 178. However, if at step 176 it is determined that the bag identification code matches the distributor identification code then at step 180 the controller 156 permits the operation sequence to continue and the dispenser is ready for use. If at step 178 the system 100 is disabled, then the controller 156 may return to step 172 to allow the end-user to investigate the matter and determine whether an improper refill container was installed in the housing. Or the end-user will need to contact the manufacturer to determine the source of the problem.

This embodiment provides a smart, cost effective means for locking out or shutting down use of a dispenser if it is determined that an unauthorized refill container has been installed. As such, the system 100 provides numerous advantages. Foremost is that the key tooling costs for the pump/nozzle mechanism and the aperture in the housing that receives the pump/nozzle mechanism are eliminated. And the costs for maintaining inefficient corresponding keys on a distributor-by-distributor basis, manufacturing procedures and distribution problems associated therewith are greatly reduced. Moreover, this electronic keying system requires minimal tooling and is relatively easy to implement in the manufacture of refill containers. Yet another advantage of the present embodiment is that any number of user identification codes are available and there are no cost penalties for adding distributor codes. The system 100 also reduces manufacturing complexity and inventory requirements. And security is enhanced by this system inasmuch as the system becomes inoperable if an improper refill container is installed.

Fluid Dispensing System Utilizing an External Electronic Key, an Electronic Lockout System and Internal Power Referring now to FIGS. 6–9, it can be seen that another fluid dispensing system made in accordance with the concepts of the present invention is designated generally by the numeral 200. The dispensing system 200 employs many of the same components as the system described in the previous embodiment, but with modifications. In particular, the system 200 includes the housing 102, but the back plate 104 provides a key port 202 for receiving an electronic key. In the preferred embodiment the key port 202 is a standard female phone receptacle jack. However, it will be appreciated that any type of connector capable of transmitting data and power may be employed. Indeed, a Universal Serial Bus (USB) connector system could be used. In any event, the key port 202 receives an electronic key, shown in FIG. 7, which is designated generally by the numeral 206.

The electronic key 206 includes a housing 208 which may be a molded or a clam-shell construction. The housing 208 retains a plug 210 which in the preferred embodiment is a four pin phone jack mateable with the port 202. Tethered to the housing 208 is a cap 212 for protecting the pins of the plug when the key is not in use. Further extending from the housing 208 is a key ring 214 to allow for attachment of the electronic key to a ring that holds a plurality of keys. Although not utilized for this particular embodiment, the housing 208 may provide a battery charger port 216. As will be discussed in detail later, batteries may be enclosed within the housing 208 and may be recharged by accessing the battery charger port 216. Such a modification would be utilized when batteries or other electrical power is not supplied within the dispenser housing and power is required to be used to activate the communication system 151 and related components.

Figure 8:
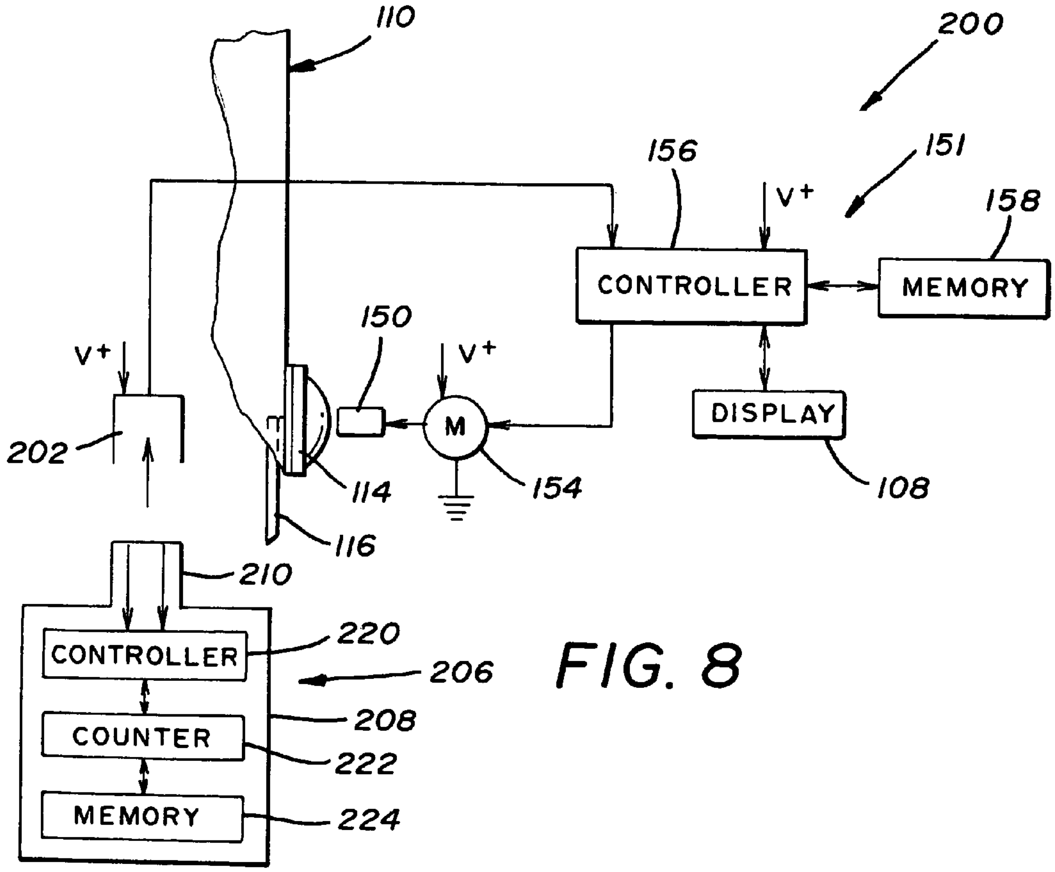
FIG. 8 is a schematic drawing of a second embodiment of a keyed fluid dispenser.

Referring now to FIG. 8 it can be seen that the electronic key includes several internal components within the housing 208. In this particular embodiment, the key 206 includes a key controller 220, if needed, which contains the necessary hardware, software and memory for communicating with the communication system 151 and in particular the controller 156 provided in the dispenser 200. The key controller 220 includes or is in communication with a key counter 222 and in further communication with a key memory device 224. The key 206 is receivable in the key port 202 to allow for communication between the key controller 220 and the dispenser controller 156. Briefly, the system 200 operates by virtue of the communication system 151 and the controller 156 comparing the "matching" code stored in the key 206 with the distributor's identification code. If a match is not made between the two, then the operational mechanism is disabled and the system 200 is shut down. A count may also be maintained by the key such that the system 200 will be shut down if the key has been used a predetermined number of times.

Figure 9:
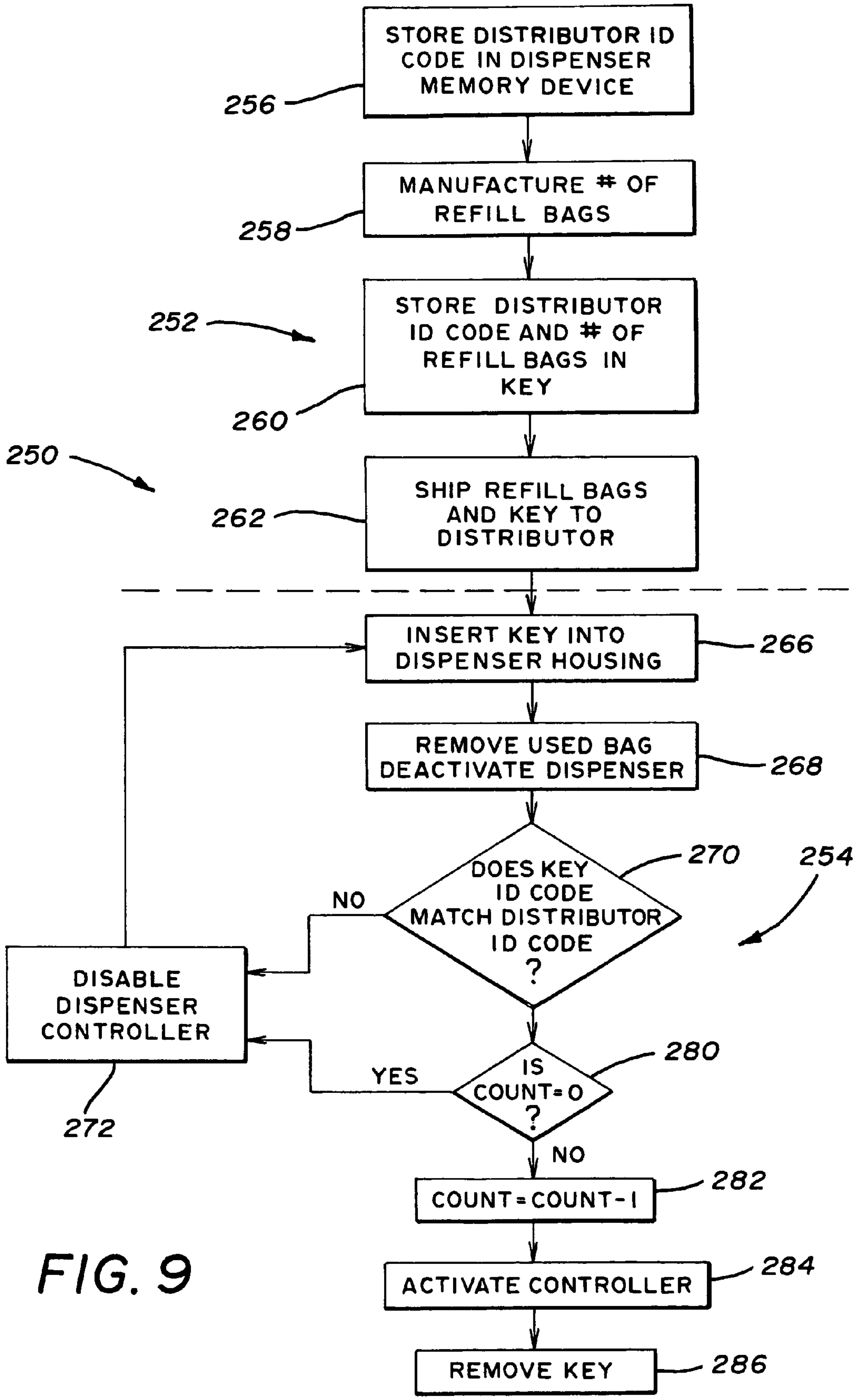
FIG. 9 is an operational flow chart of the fluid dispenser shown in FIG. 8.
Figure 10:
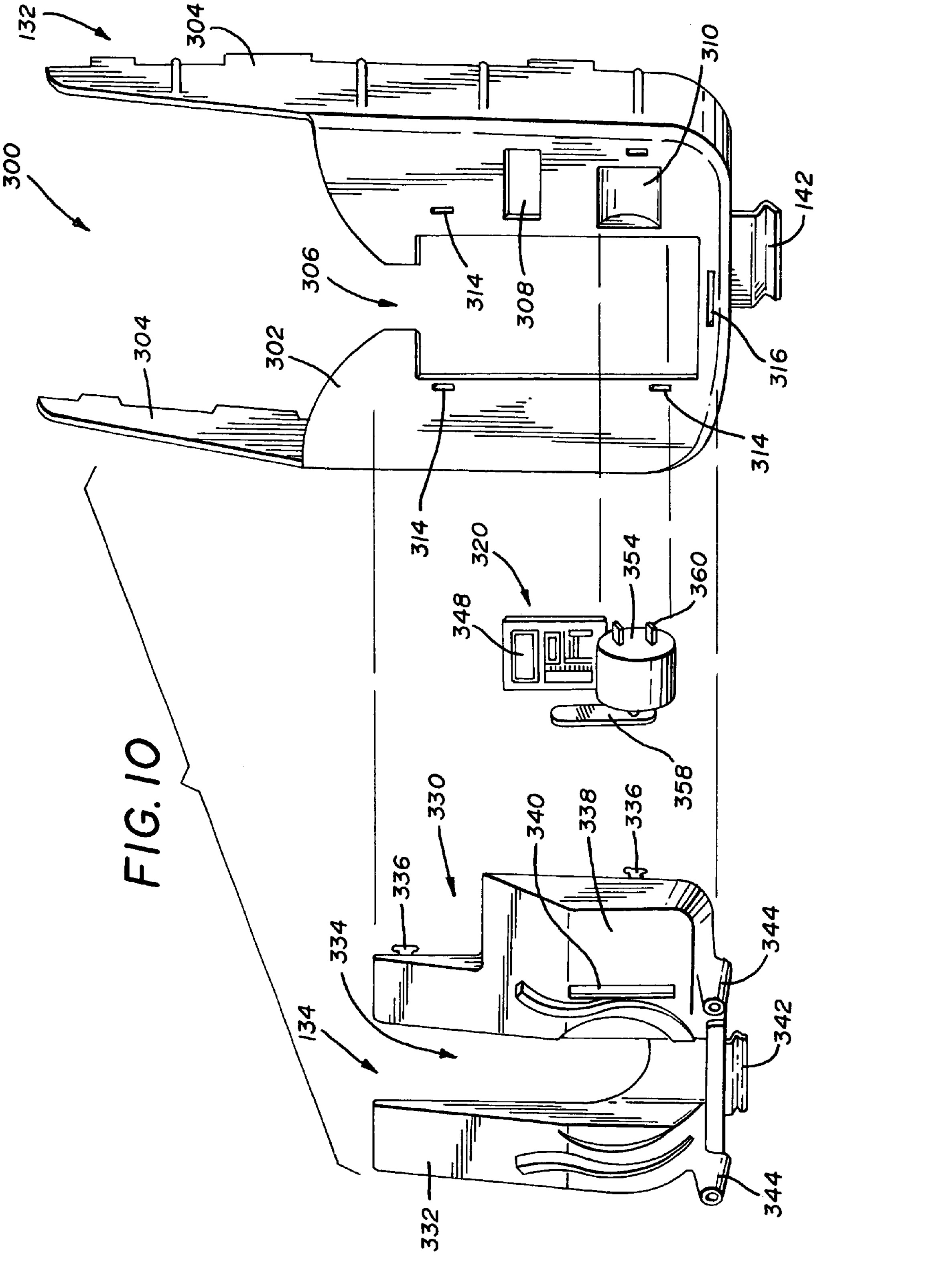
FIG. 10 is an exploded view of the internal workings of a fluid dispenser's internal components made in accordance with the concepts of the present invention.

Reference is now made to FIG. 9 which sets forth operational steps for manufacturing the dispenser and the container bags, and for utilizing the key 206 with the system 200. The operational flow chart is generally designated by the numeral 250 and includes a series of manufacturing steps designated generally by the numeral 252 and a series of refill replacement steps designated generally by the numeral 254. In regard to the manufacturing steps 252, the first step 256 sets forth that the manufacturer stores the distributor identification code in the dispenser memory device 158. At step 258, the manufacturer manufactures a predetermined number of refill containers 110. At step 260, the manufacturer stores the "matching" identification code, if desired, and the number of refill containers manufactured in step 258 in the key memory 224. In particular, the number of refill containers associated with the predetermined value is stored in the key counter 222. At step 262 the manufacturer ships the refill containers and the key associated with those refill containers to the distributor. The key may be included in the box with the refill containers or may be shipped separately for security reasons.

The installation steps, designated by the numeral 254, include a step 266 wherein the distributor inserts the key 206 into the key port 202. This activates the communication system 151 and thus the controller 156. At step 268 the housing is opened, the old refill container is removed and the new refill container is installed. It will be appreciated in this embodiment that the refill container is not required to provide a communication device such as a radio frequency ID tag or bar code label. In any event, with the key installed, the controller 156 communicates with the key controller 220 for comparison of the dispenser identification code stored in memory 158 with the matching code stored in the key memory 224, wherein the key functions as the communication device. Accordingly, at step 270 the controller 156 determines whether the matching code matches the distributor identification code. If the codes do not match, then at step 272 the operational mechanism—the motor 154, the actuator 150 and related components—are disabled and use of the system is prevented. An indication of such a disablement may be shown on the display 108 indicating to the user that an improper key has been inserted or the like. Subsequent to step 270 the controller 156 inquires from the counter 222 as to the number of counts remaining in the controller 156. If it is determined that the count is equal to zero then the process again proceeds to step 272 and the dispenser controller 156 is disabled. This allows a specific number of refills to be associated with a particular distributor and even a particular location. In other words, once the predetermined number of refills associated with a key are exhausted, it becomes evident that a new key is required. This information could also be presented on the display 108. If at step 280 it is determined that the count is not equal to zero then the process proceeds to step 282 and the controller 220 decrements the counter 222. It will be appreciated by those skilled in the art that instead of using a down counter that an up counter could also be employed. In any event, at step 284 the controller 156 is activated so as to enable use of the operational mechanism which in this case includes at least the motor 154 and the dispensing mechanism 150. Finally, at step 286, the key is removed and the unit is ready for operation.

The system 200 described above is most likely a hands-free device or a dispenser device that employs a battery power source for primarily obtaining a count of the number of uses of the device, providing a wash timer and for providing the user with other information regarding the operational status of the device. The power source may also be used to determine the presence of the key 206 and to compare informafion previously stored regarding the dispenser's identification code and the key's matching code.

This particular embodiment is advantageous for all of the reasons listed in the previous embodiment. Moreover, it allows for the manufacturer to control the number of refills used in a particular lot and can associate a key with a particular lot of refill containers. Accordingly, when all of the refill containers in a lot are exhausted, the distributor must contact the manufacturer to obtain a new production run of refill products along with a key to allow access to the housings.

Fluid Dispensing System Utilizing an External Electronic Key, a Mechanical Lockout System and Internal Power Referring now to FIGS. 10–13 it can be seen that a fluid dispensing system utilizing an external electronic key, a mechanical lockout and internal power is designated generally by the numeral 300. In order to implement this particular embodiment modifications are made to a refill carrier which is designated generally by the numeral 132 in FIG. 10. In particular, the carrier 132 includes a carrier wall 302 from which perpendicularly extends a side wall 304. The carrier wall 302 provides an opening 306 for receipt of the pump mechanism 114 and nozzle 116. The carrier wall 302 also provides a window 308 and an inwardly extending pocket 310. Extending from a bottom edge of the wall 304 is the latch 142 which was previously identified in FIG. 1. Extending through the carrier wall 302 are a plurality of shell slots 314 which are arranged about the periphery of the opening 306. Extending through the wall 302 and positioned below the opening 306 is a latch slot 316.

Received in the pocket 310 and associated in close proximity to the window 308 is a detector/lockout assembly designated generally by the numeral 320. The assembly 320 is mounted to the carrier wall 302 and forms the primary component of the operational mechanism. The operational structure and benefits of the assembly 320 will be discussed in detail further below.

A shell 330 is coupled to the carrier wall 302 and captures the lockout assembly 320 therebetween. The shell 330 includes a frame 332 which has a frame slot 334 aligned with the opening 306. It will be appreciated that together the frame slot 334 and the opening 306 to support the pump mechanism 114 and the nozzle 116 when the refill container is inserted into the refill carrier 132. Extending from the frame 332 are a plurality of shell tabs 336 which are receivable by and mate with the shell slots 314. The frame 332 also provides an assembly compartment 338 such that the assembly 320 is received therein and captured between the shell 330 and the carrier wall 302. The assembly compartment 338 provides a lock arm slot 340 which is substantially parallel to the frame slot 334. The shell 330 also provides a shell latch 342 which is receivable in the latch slot 316 for the purpose of securing the shell 330 to the carrier wall 302. Extending outwardly out from the frame 332 are a pair of push bar stops 344 which stop the over travel of a push bar wherein the dispenser 300 employs actuation of a push bar to dispense a quantity of fluid.

The detector/lockout assembly 320 includes a bar code sensor 348 for the purpose of detecting a bar code 128 that is provided on the refill bag 110. Of course, it will be appreciated that other types of sensor detection or communication devices could be used depending upon the type of communication device attached to the refill bag.

The assembly 320 includes a motor 354 which rotates a shaft 356 that is connected to a push bar lock arm 358. An exemplary motor is manufactured by Mabuchi Motor Co. of Japan and identified as a part number RE-260RA which has an operating torque of 6.86 mN·m. Upon rotation of the shaft 356 the lock arm 358 is extendable through the lock arm slot 340. A pair of power leads 360 extend from the motor 354 and are connected to the batteries provided within the dispenser or, in the alternative, by a powered key.

Figure 11A:
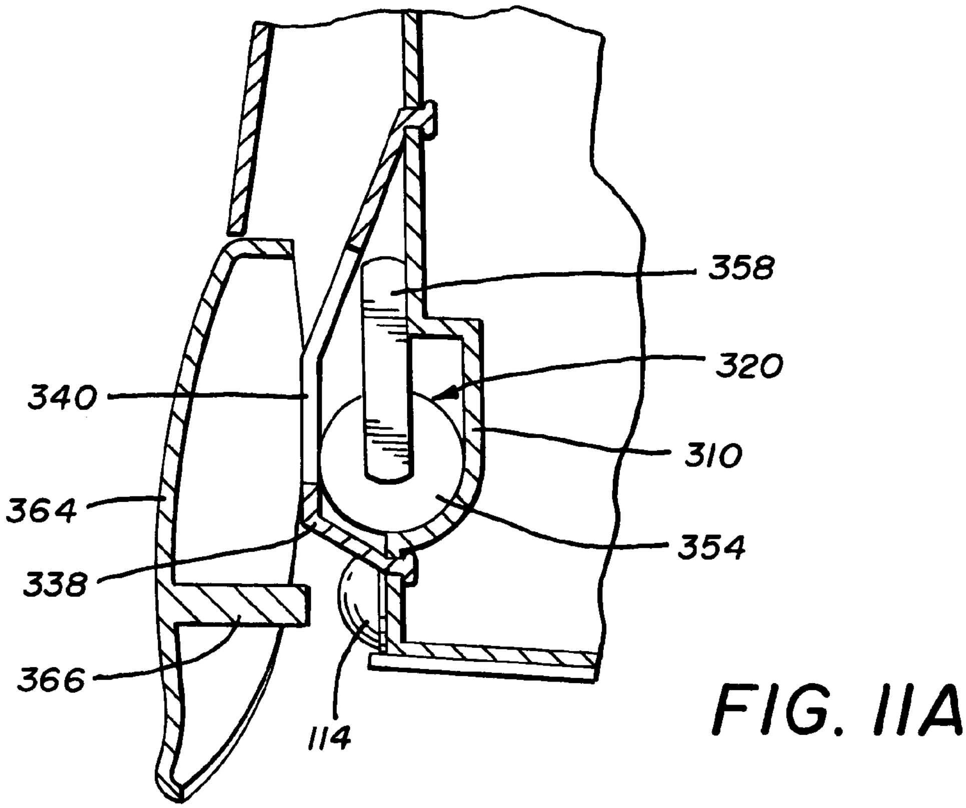
FIGS. 11A and 11B are cross-sectional drawings of a dispenser's push bar and a locking arm mechanism utilized in an exemplary fluid dispenser.
Figure 11B:
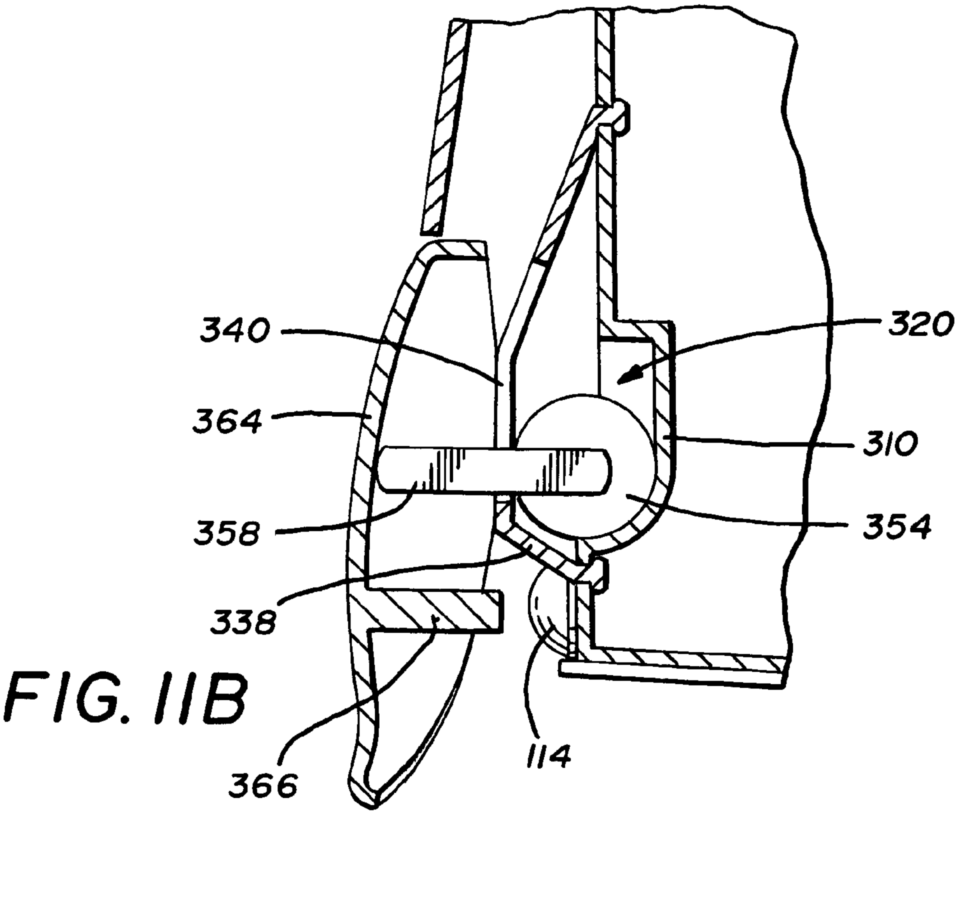

As best seen in FIGS. 11A and B, the dispenser housing 102, and in particular the front cover 106, has pivotably mounted thereto a push bar 364. Extending inwardly from the push bar 364 is an actuator 366 which in normal operation is allowed to engage the pump mechanism 114. Accordingly, upon inward depression of the push bar 364, the actuator 366 engages the pump mechanism 114 which in turn dispenses a measured quantity of fluid out the nozzle 116. In normal operation the lock arm 358 is retained within the compartment 338. However, when the assembly 320 is activated, the motor 354 rotates the shaft 356 and in turn the lock arm 358 extends through the lock arm slot 340 and precludes movement of the push bar 364. And as in the previous embodiment, the controller 156 provides the necessary hardware, software and memory for implementing the operation of the dispensing system 300. The system 300 utilizes the communication system 151 to compare the matching code stored in the key memory 224 with the distributor's identification code stored in the memory 158. If a match is made between the two communication devices, then the operational mechanism is disabled. In particular, the lock arm 358 is activated and movement of the push bar 364 is inhibited. A count may also be maintained to limit use of the key.

Figure 12:
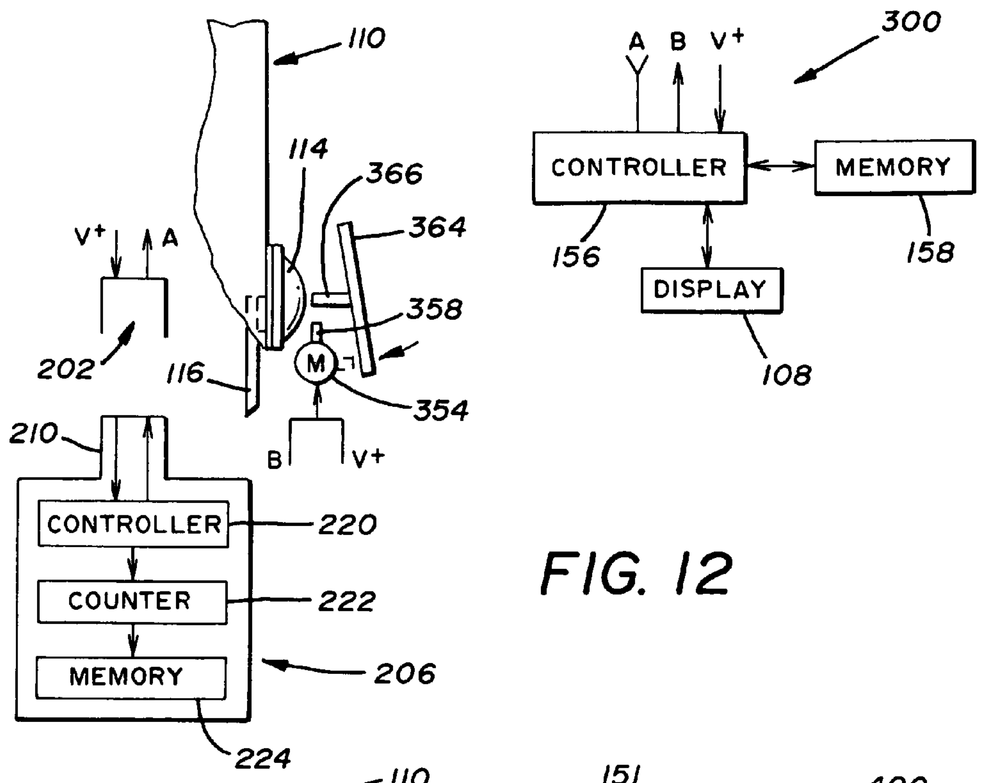
FIG. 12 is a schematic drawing of a third embodiment of a keyed fluid dispenser.

Referring now to FIG. 12, it can be seen that the dispensing system 300 is schematically represented. It will further be appreciated that connections between the various components may be designated by alphabetic letters inasmuch as the key port 202 provides a connection A between the port 202 and the controller 156. Likewise, a connection B is provided between the controller 156 and the motor 354.

Figure 13:
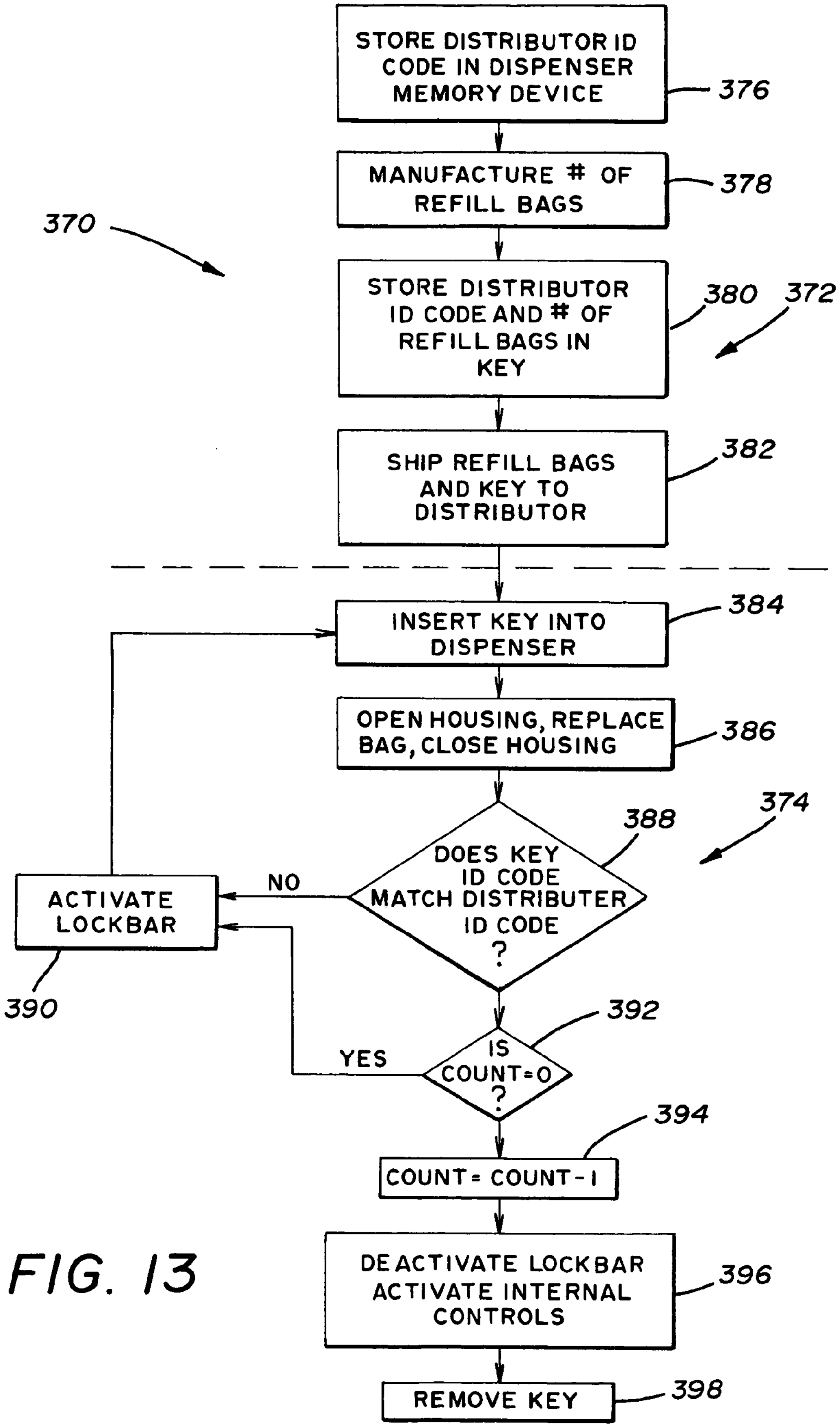
FIG. 13 is an operational flow chart of the fluid dispenser shown in FIG. 12.

Referring now to FIG. 13, with reference to FIG. 12, an operational flow chart setting forth the steps of manufacture and installation of a dispensing system and a refill container is designated generally by the numeral 370. In the flow chart 370 the manufacturing steps are generally designated by the numeral 372 and the installation steps are generally designated by the numeral 374.

In regard to the manufacturing steps, at step 376 the manufacturer stores a distributor identification code in the dispenser's memory device 158. At step 378, a predetermined number of refill containers to be associated with a particular distributor are manufactured. At step 380, the manufacturer stores a distributor identification code and the number of containers associated with a particular lot to be sent to the distributor in the key memory device 224. Finally, at step 382, the refill containers and the programmed key 206 are shipped to the distributor. As noted previously, the refill containers and the key may be shipped separately to the distributor for security reasons.

The installation steps require, at step 384, that the key 206 be inserted into the port 202 to activate the controller 156 and to power the electronic key. The installer may then open the housing, remove the old refill and install the new refill. The dispenser cover is then closed at step 386. With the key 206 remaining in the port 202, the controller 156 queries the detection circuit 152 to determine whether the matching code stored in the key memory 224 matches the identification code stored in the memory 158. If the codes do not match then, at step 390, the controller 156 activates the motor 354 and the lock bar 358 is rotated to prevent the push bar 364 from being actuated. If however, the matching code stored in the key 206 matches the identification code stored in the memory device 158, then the process continues to step 392 where it is determined whether the count stored in the counter 222 is equal to zero or some other predetermined value. If so, the process proceeds again to step 390 and the lock bar 358 is activated to prevent movement of the push bar 364. However, if the count is not equal to zero or other predetermined value then the process continues to step 394 where the counter 222 is decremented by one and stored.

If the lock bar has been activated at step 390 then the process may return to step 384 to await insertion of a new key that is properly associated with the dispensing device. In any event, at step 396 if it is determined that the key does match and the count is not equal to zero then the lock bar rotates back to a home position within the compartment, if needed, to allow movement of the push bar 364. Additionally, all of the other controls are allowed to be implemented by the controller 156 if the codes match and the count is not equal to zero. Finally, at step 398 the key is removed and the dispensing system operates in a normal manner.

In addition to providing all of the benefits previously described for the other embodiments, the present embodiment is advantageous in that it may be employed to prevent actual use of the dispenser push bar. Moreover, modification of the dispensing unit to remove the lock bar or the assembly 320 will destroy the device such that it cannot hold the refill container in a proper position and as such the dispensing system 300 is rendered inoperative. Moreover, once the counter is reduced to a zero or other predetermined value it loses all of its memory and can no longer be associated with any other distributor's identification code.

Figure 14:
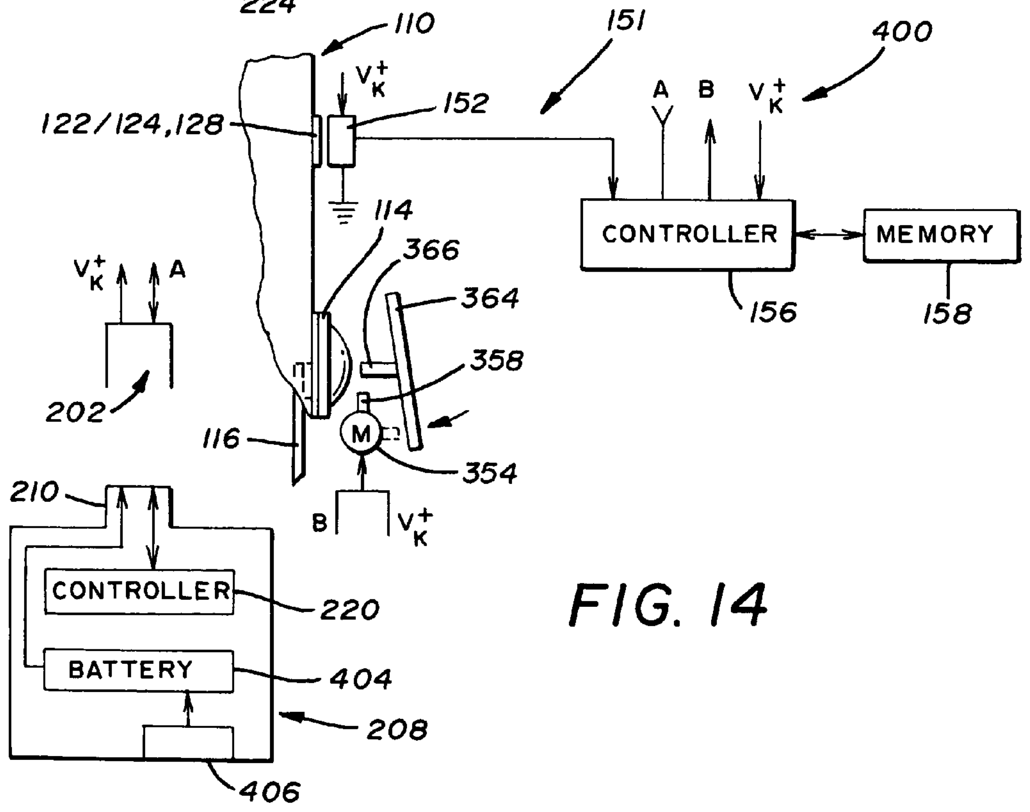
FIG. 14 is a schematic diagram of a fourth embodiment of a keyed fluid dispenser.
Figure 15:
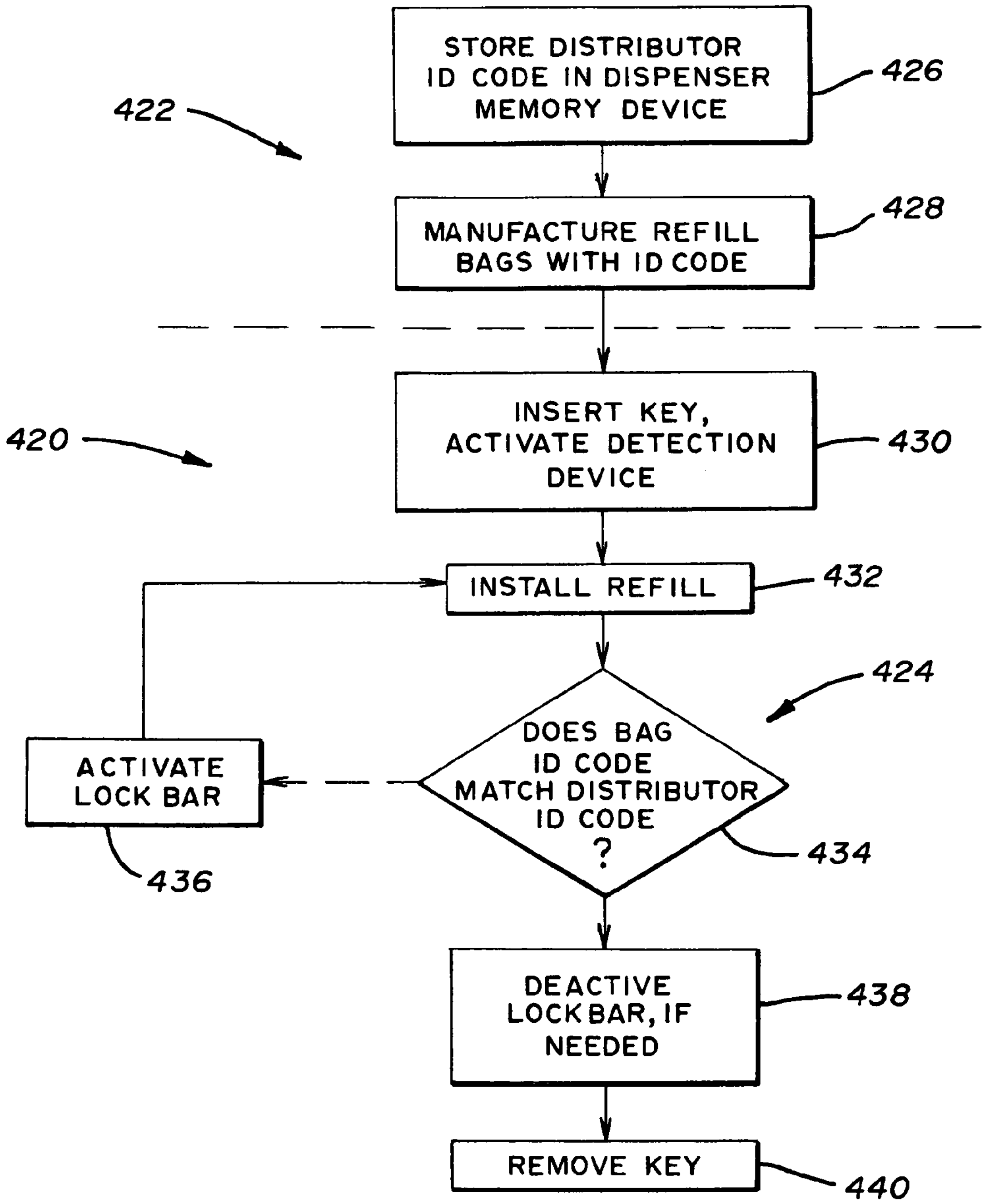
FIG. 15 is an operational flow chart of the fluid dispenser shown in FIG. 14.

Fluid Dispensing System Utilizing an Internal Electronic Key, a Mechanical Lockout System and External Power Referring now to FIGS. 14 and 15, a fluid dispensing system utilizing a mechanical lockout system and external power is designated generally by the numeral 400. This particular system 400 incorporates features of the systems previously discussed in FIGS. 3–6, 7, 10 and 11. In this particular embodiment, the key 206 includes a rechargeable battery 404 which may be rechargeable or non rechargeable. As designated in the schematic drawing, the battery 404 provides a voltage supply designated as $V_k^+$. Accordingly, all power required for operation of the system 400 is provided by the key and no internal dispenser batteries are required. The key 206 may utilize a battery port 406 maintained in the housing 208. In the preferred embodiment, the battery 404 may be a rechargeable nickel cadmium battery that is rechargeable by plugging an appropriate adapter into the battery port 406. Of course other types of rechargeable batteries could be use. The communication system 151 in this embodiment employs a code detector 152 which detects the presence of a tag 122 and associated antenna, or a bar code label 128. As such, the detector 152 is configurable to read most any type of electronically coded information. It will also be appreciated that this particular embodiment employs a push bar mechanism 364 for dispensing a quantity of fluid. Accordingly, in order to block movement of the push bar in this embodiment, an operational mechanism such as the lockout mechanism or detector/lockout assembly 320 is incorporated. Accordingly, the system 400 operates in much the same manner as the system 300 except that power is provided by the key 206, and the matching code is provided by a communication device carried by the refill container.

Referring now to FIG. 15, it can be seen that an operational flow chart for the system 400 is designated generally by the numeral 420. The steps directed to the manufacturing of the system and refill containers are designated generally by the numeral 422. The installation and use steps are designated generally by the numeral 424.

At step 426 the manufacturer stores the distributor identification code in the housing's memory device 158. At step 428 the refill containers 110 are manufactured and an identification code is stored in the tag 122 or in the bar code 128. It is believed that the refill containers will be shipped separately from the dispenser as needed by the end-user.

Referring now to the installation steps 424, a first step 430 includes insertion of the key 206 into the port 202. Insertion of the key 206 powers both the communication system 151, including the controller 156, and the motor 354. This allows for reading of the electronic coding provided by either the tag 122 or the bar code 128 in a manner previously described. The housing is then opened and the refill is placed into a position within the dispenser housing such that the detection circuit 152 can communicate with the appropriate electronic coding. At step 434 the controller 156 determines whether the identification code associated with the tag 122 matches the identification code stored in the memory 158. If a match is not detected, then the controller 156 activates the motor 354 and the lock bar is activated and placed in a blocking position at step 436. However, if the bag identification or matching code matches the distributor identification code stored in the memory 158 then the controller 156 will not activate the motor or, in the alternative, reverses the motor and withdraws the lock bar from a blocking position if previously in a locked position such that the push bar is now able to engage the pumping device 114. Upon release of the locking arm the key 206 may be removed at step 440 and the dispensing system is ready for normal operation.

The system 400 provides many of the same advantages as the embodiments previously described. Additionally, the present invention is advantageous in that the housing itself does not require the installation of batteries inasmuch as the power is supplied through the key 206. This device is further advantageous in that if the electro-mechanical lockout system is tampered with the system 400 is rendered inoperative. Yet another advantage of the present embodiment is that the batteries are contained within the key and as such the key can be recharged at any time thus saving costs of maintaining batteries in each of the dispenser housings.

Fluid Dispensing System Utilizing an External Electronic Key, a Cabinet Latching Mechanism and External Power Referring now to FIGS. 16–19 it can be seen that a fluid dispensing system utilizing an external electronic key, a cabinet latching mechanism and external power is generally designated by the numeral 500. Some of the unique components of the system 500 are shown in FIGS. 16A–C, and also FIGS. 17A–D, wherein a dispenser housing latching mechanism is only actuated upon insertion of an electronic key with a code that matches a code previously stored in the housing and wherein the key powers the movement of the latching mechanism. In this embodiment the latching mechanisms functions as the operational mechanisms that enable dispensing of material from the refill container.

Figure 16A:
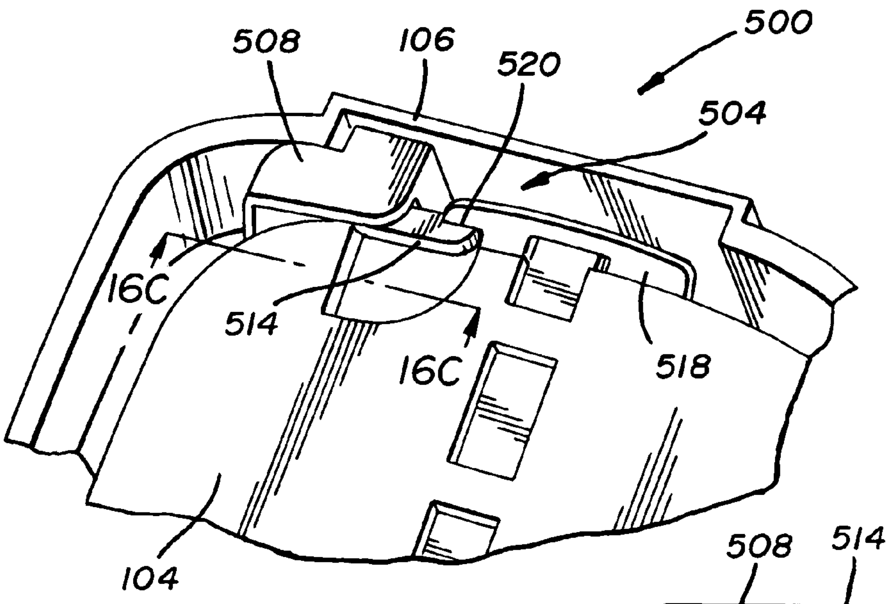
FIGS. 16A–C are rear perspective and partial cross-sectional drawings of a latching mechanism utilized by an exemplary fluid dispenser.
Figure 16C:
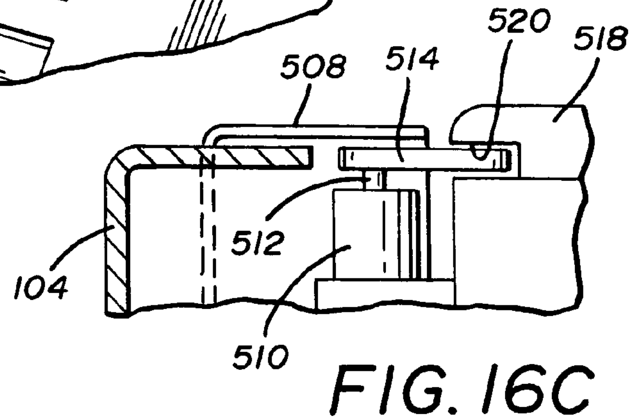
Figure 16B:
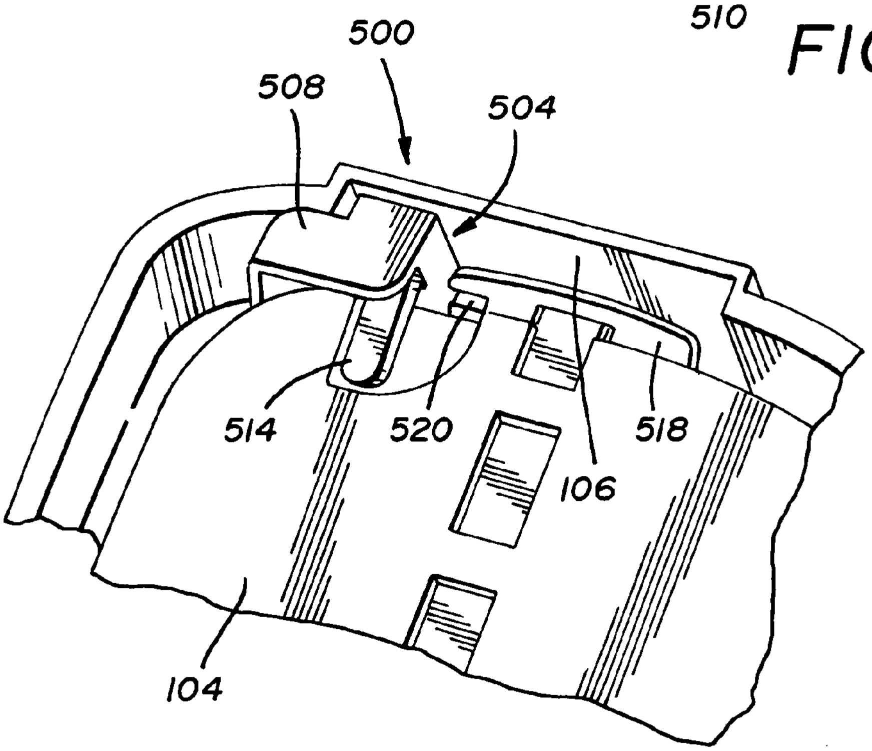

This embodiment envisions two alternative latching mechanisms one of which is shown in FIGS. 16A–C. In particular, the dispenser includes a latch mechanism designated generally by the numeral 504. The latch mechanism 504 is interposed between the back plate 104 and the backside of the front cover 106. In particular, the latch mechanism 504 includes a latch carriage 508. The carriage 508 maintains a motor 510 which rotates a shaft 512. Connected to the shaft 512 is a latch arm 514 which rotates with shaft 512.

Extending from the back plate 104 is a back plate extension 518 that engages the latch arm 514. In particular, the back plate extension 518 provides a back plate notch 520 which receives the latch arm 514 when it is rotated to an unlocked position. In the unlocked position, the front cover 106 is detachable from the back plate so as to allow access into the internal workings of the housing 102.

Figure 17A:
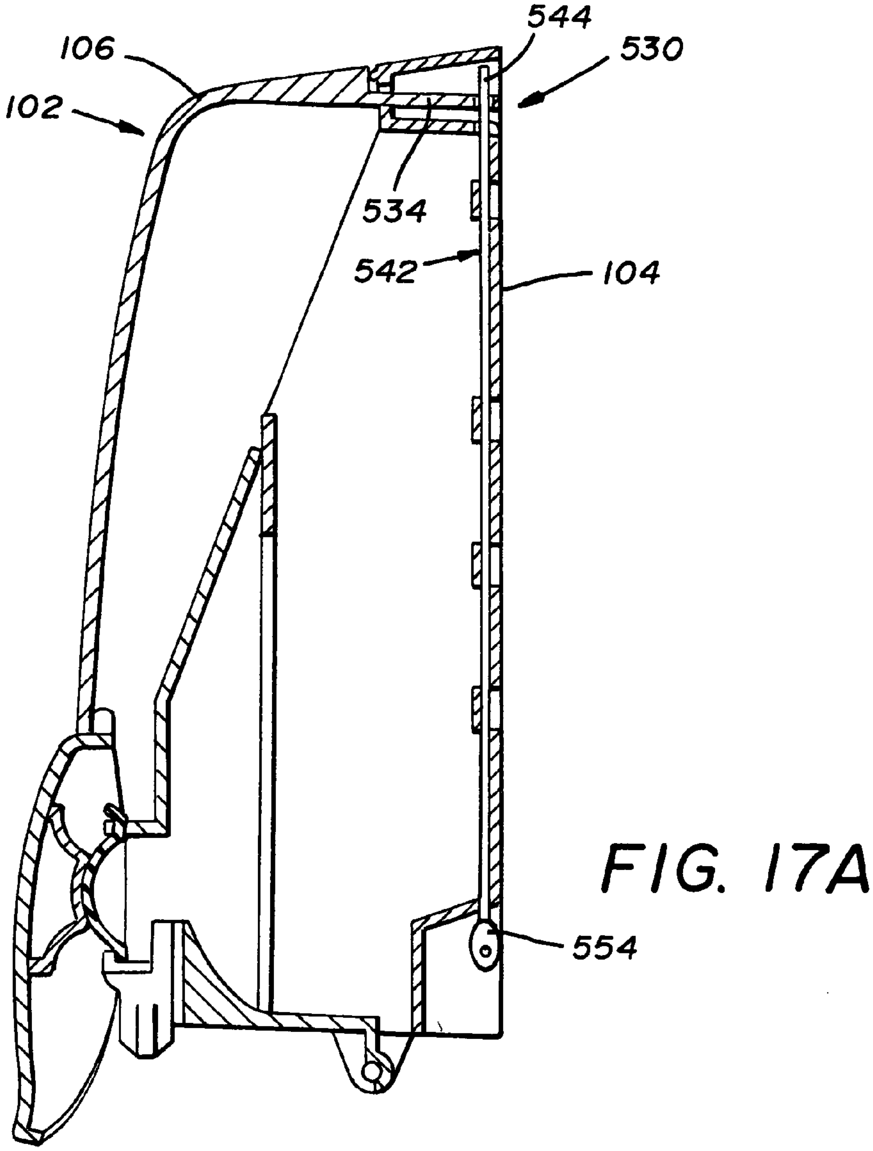
FIGS. 17A–D are cross-sectional and schematic drawings showing an alternative latching mechanism utilized by an exemplary fluid dispenser.
Figure 17B:
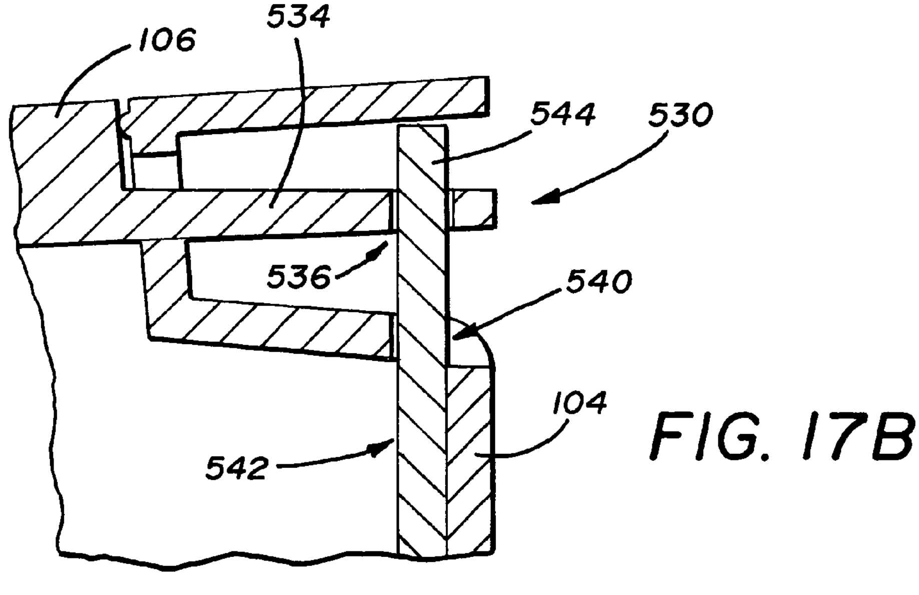
Figure 17C:
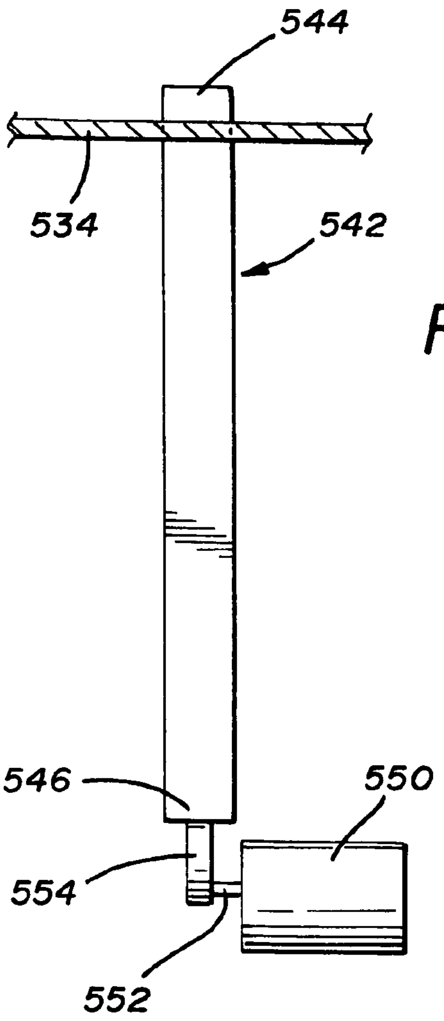
Figure 17D:
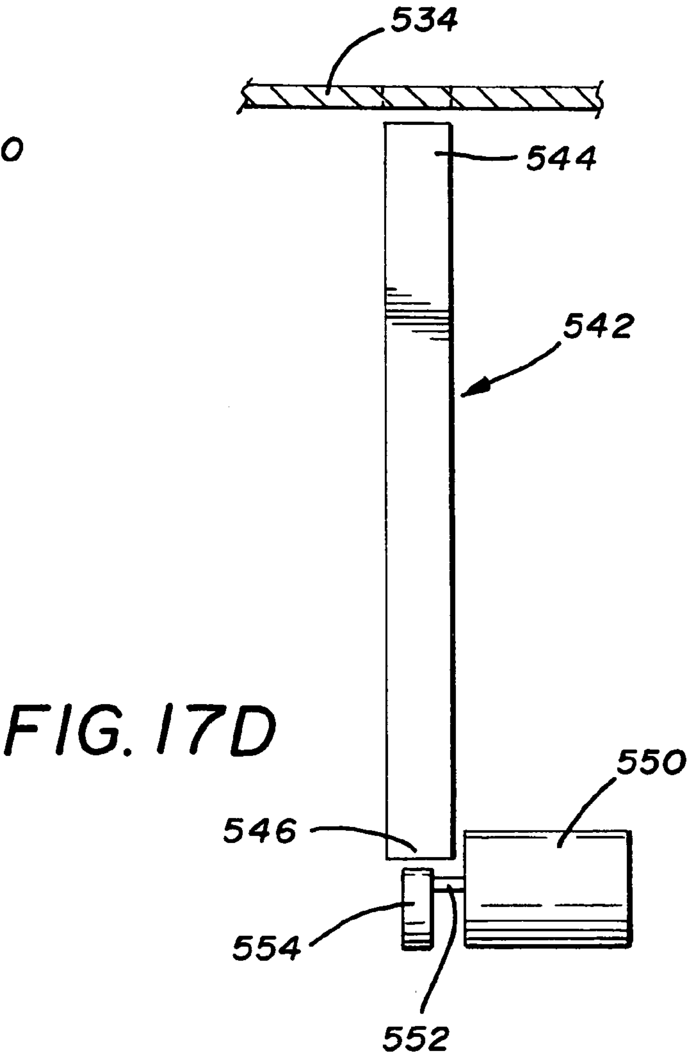

Referring now to FIGS. 17A–D it can be seen that another latch mechanism is designated generally by the numeral 530. The mechanism 530 is interposed between the front cover 106 and the back plate 104. In particular, the latch mechanism 530 incorporates the front cover 106 which provides a cover arm 530 which has an arm hole 536 extending therethrough. The back plate 104 includes a bar opening 540 which slidably receives a slide bar 542. The bar 542 includes an arm end 544 which is receivable in the arm hole 536 and which is opposite a cam end 546. Included as part of the latch mechanism 530 is a motor 550 which rotates a shaft 552. Extending from a distal end of the shaft 552 is a cam 554 which is rotatable and which engages the cam end 546. Accordingly, as best seen in FIG. 17C, with the cam 554 rotated to a first position, the arm end 544 extends through the arm hole 536 and prevents movement of the front cover with respect to the back plate 104. As seen in FIG. 17D when the cam 554 is rotated the cam end 546 allows for downward movement of the bar 542 and as such the arm end 544 is disengaged from the cover arm 534. Accordingly, the front cover can then be hingedly or pivotably moved away from the back cover 104 to allow access to the refill container and the internal components of the fluid housing.

Figure 18:
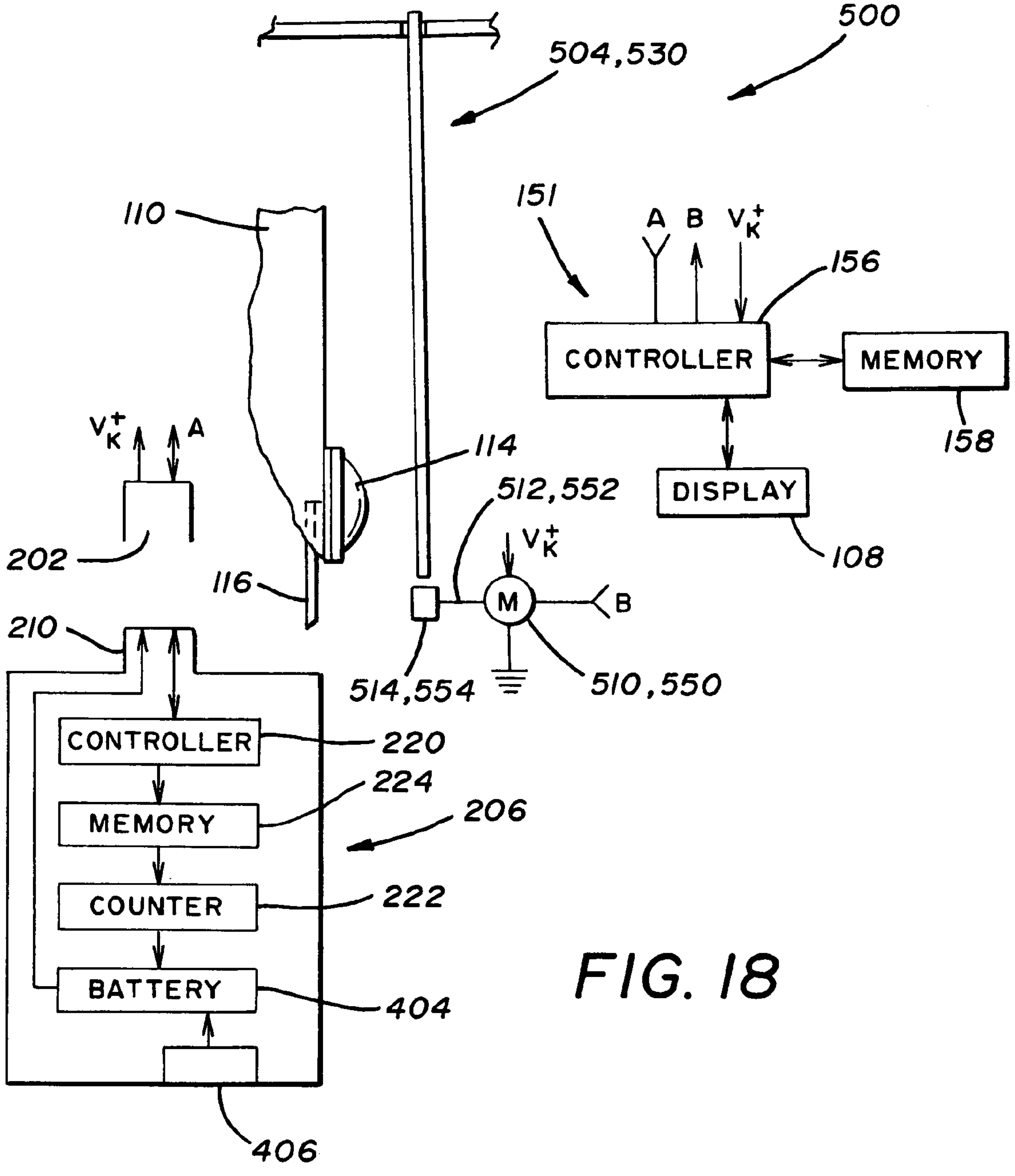
FIG. 18 is a schematic drawing of a fifth embodiment of a keyed fluid dispenser utilizing the latching mechanisms shown in FIGS. 16 and 17.

Referring now to FIG. 18 it can be seen that a powered key is utilized which functions as a communication device with a counter and memory device for storing an identification code. The latching mechanism is schematically represented by the numerals 504 and 530 and reference is made to FIGS. 16 and 17 for the particular details of each mechanism. Any use of either of the latching mechanisms 504, 530 requires a motor 510, 550 that is controlled by the controller 156.

The dispenser 500 receives power from the key battery 404 which powers the motor 510, 550 and the communication system 151 and, if needed, the display 108. The confirmation system 151 compares the matching code stored in the memory 224 with the code stored in memory 158. Depending upon whether the codes match, the motor 510, 550 may be activated. The controllers 156 and 220 may also operate a counter 222 to limit the number of uses of the key 206. The battery 404 retained in the key 206 may be rechargeable.

Figure 19:
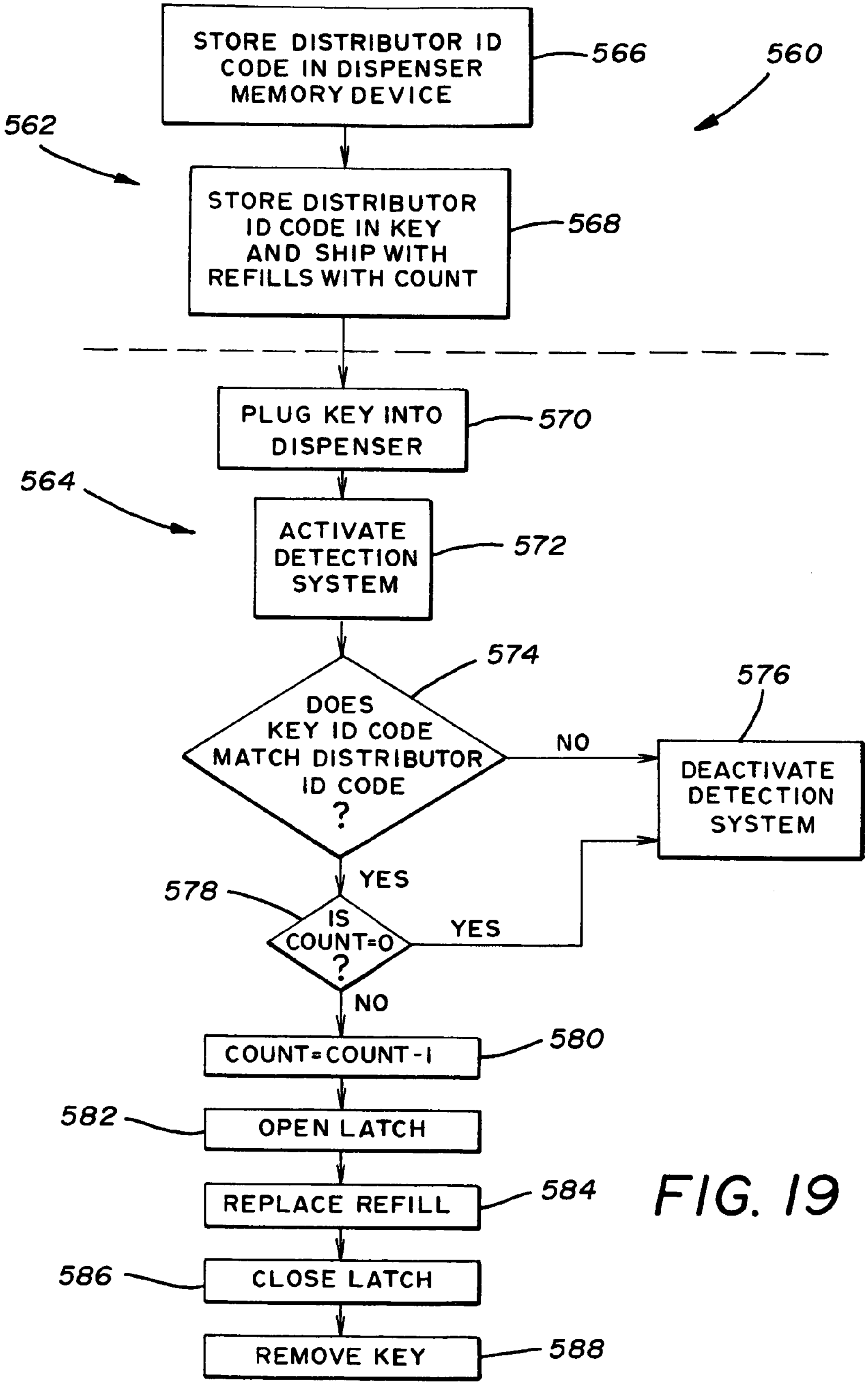
FIG. 19 is an operational flow chart of the fluid dispenser shown in FIG. 18.

Referring now FIG. 19, the operational steps for utilizing the dispensing system 500 are designated generally by the numeral 560. The manufacturing steps for the system are designated generally by the numeral 562 and the operational steps of the system 500 are designated generally by the numeral 564.

At step 566, the manufacturer stores a distributor identification code in the dispenser memory device 158. Next, at step 568, the manufacturer stores a distributor identification or matching code in the key 206 and in particular in the memory device 224. Additionally, the number of refills to be shipped with a particular lot may be stored in the key memory 224. In other words, if a refill lot size is 50 then the number 50 is stored in the memory 224.

Referring now to the installation steps, as a first step 570 the distributor plugs the key 206 into the dispenser key port 202. By virtue by the power supply ($V_k^+$) contained within the key, electrical power is transferred to both the controller 156, the motor 510, 550 and wherever else needed in the system 500. This will allow, at step 572, activation of the communication system 151. Next, at step 574, the controller 156 compares the identification code stored in memory device 158 with the matching code stored in the memory device 224. If it is determined that these two codes do not match one another then at step 576 the system is deactivated and the latching mechanisms remain locked. But, if it is determined that the codes do match then the process proceeds to step 578 wherein the controller 156 queries the counter 222 to determine what the count value is. If it is determined that the count value is zero or some other predetermined value then the process returns to step 576 and the detection system is deactivated and the latches remain engaged. However, if the count is not equal to zero or the predetermined value then the process proceeds to step 580 where the count is decremented by one. Subsequently, at step 582, the controller 156 activates the motor 510, 550 so as to allow for pivotable movement of the front cover with respect to the back plate. At this time, the distributor may replace the refill container at step 584 and then close the latch at step 586. Accordingly, upon removal of the key at step 588 the system relatches the front cover to the back plate and the dispenser is ready for use.

This embodiment provides all the advantages of the previous embodiments discussed and further provides an advantage in an operational mechanism for precluding access to the internal workings of the dispenser without first utilizing the electronically powered key 206. Accordingly, all embodiments disclosed herein provide the advantages lacking in the prior art devices. In particular, use of an electronic key, storage of an identification code within a controller maintained in the dispenser and/or use of the matching code with a refill container allows for flexibility in a manufacturers relationship with the distributor in that control of the number of refill bags shipped and maintained in inventory is significantly reduced. Further, the distributor is assured of the ability to maintain their refill business and the manufacturer is assured of the distributor's use of just their product.

Thus, it can be seen that the objects of the invention have been satisfied by the structure and its method for use presented above. While in accordance with the Patent Statutes, only the best mode and preferred embodiment has been presented and described in detail, it is to be understood that the invention is not limited thereto or thereby. Accordingly, for an appreciation of the true scope and breadth of the invention, reference should be made to the following claims.

What is claimed is:

1. A fluid dispensing system comprising:

a housing having a first data communication device associated therewith;

wherein said first data communication device has stored therein an identification code associated with said housing a refill container carrying a fluid material and having a second data communication device associated therewith, wherein said second data communication device has stored therein a matching code associated with said refill container said refill container receivable in said housing;

an operational mechanism associated with one of said housing and said refill container to enable dispensing a measured quantity of said material, wherein said operational mechanism comprises a pump mechanism carried by said refill container, a nozzle operatively connected to said pump mechanism, wherein actuation of said pump mechanism dispenses a quantity of said material through said nozzle, and a pump actuator carried by said housing positioned proximally said pump mechanism; and a controller in communication with said first and second data communication devices to facilitate sharing of data therebetween and to selectively enable said operational mechanism, wherein said pump actuator is disabled by said controller if said identification code does not match said matching code.

2. The system according to claim 1 further comprising:

an actuator motor coupled to said pump actuator, wherein said actuator motor is disabled by said controller if said matching code does not match said identification code.

3. The system according to claim 1, further comprising:

an actuator bar coupled to said pump actuator, wherein said actuator bar is blocked by said controller if said matching code does not match said identification code.

4. The system according to claim 3, wherein said operational mechanism further comprises:

a detector/lockout assembly carried by said housing;

said detector/lockout assembly comprising a lockout motor having a rotatable shaft; and a pushbar lockarm fixed to said shaft, said lockout motor rotating said shaft and said pushbar lockarm into a blocking position with respect to said pump actuator.

5. The system according to claim 4, further comprising:

a key carrying a power supply;

said housing having a port for receiving said key;

said power supply providing power to said controller and to said lockout motor when inserted into said port.

6. The system according to claim 5, wherein said power supply is a rechargeable battery.

7. The system according to claim 6, wherein said key provides a battery port for connecting to said rechargeable battery.

8. The system according to claim 1, wherein said second data communication device comprises:

a tag for carrying said matching code, said tag carried by said refill container; and wherein the dispensing system further comprises a communication system comprising a dispenser controller;

a code detector for obtaining said matching code from said tag;

a dispenser memory device for storing said identification code; and said dispenser controller obtaining said matching code from said code detector and said identification code from said dispenser memory device to determine if said codes match one another.

9. The system according to claim 1, wherein said second data communication device comprises:

a bar code for carrying said matching code, said bar code carried by said refill container; and said system further comprises a communication system comprising a dispenser controller;

a bar code reader for reading said bar code;

a dispenser memory device for storing said identification code; and said dispenser controller obtaining said matching code from said bar code reader and said identification code from said dispenser memory device to determine if said codes match one another.

10. The system according to claim 1, further comprising:

a key for carrying said matching code;

said housing having a key port for receiving said key; and a communication system coupled to said key when received in said key port.

11. The system according to claim 10, wherein said operational mechanism comprises:

a pump mechanism coupled to said refill container;

a nozzle operatively connected to said pump mechanism, wherein actuation of said pump mechanism dispenses a quantity of said material through said nozzle; and a pump actuator positioned proximally said pump mechanism, wherein said pump actuator is disabled by said controller if said identification code does not match said matching code.

12. The system according to claim 11, further comprising:

an actuator bar coupled to said pump actuator, wherein said actuator bar is blocked by said controller if said matching code does not match said identification code.

13. The system according to claim 12, further comprising;

a key controller carried by said key;

said communication system comprising a dispenser controller; and a dispenser memory device for storing said identification code, said dispenser controller obtaining said matching code from said key controller, and said identification code from said dispenser memory device to determine if said codes match one another.

14. The system according to claim 13, further comprising:

a key count value stored by said key controller, said key controller adjusting a said key count value after each successful matching of said matching code with said identification code.

15. The system according to claim 14, wherein said dispenser controller disables said pump actuator if said key count value is equal to a predetermined value.

16. The system according to claim 12, wherein said operational mechanism comprises:

a detector/lockout assembly carried by said housing;

said detector/lockout assembly comprising a lockout motor having a rotatable shaft; and a pushbar lockarm fixed to said shaft said lockout motor rotating said shaft and said pushbar lockarm into a blocking position.

17. The system according to claim 14, further comprising:

a dispenser display for displaying said count value.

18. The system according to claim 11, wherein said operational mechanism further comprises an actuator motor coupled to said pump actuator, wherein said actuator motor is disabled by said controller if said matching code does not match said identification code.

19. The system according to claim 18, further comprising:

a key controller carried by said key;

said communication system comprising a dispenser controller;

a dispenser memory device for storing said identification code, said dispenser controller obtaining said matching code from said key controller, and said identification code from said dispenser memory device to determine if said codes match one another.

20. The system according to claim 19, further comprising:

a key count value stored by said key controller, said key controller adjusting a said key count value after each successful matching of said matching code with said identification code.

21. The system according to claim 20, wherein said dispenser controller disables said pump actuator if said key count value is equal to a predetermined value.

22. The system according to claim 10, wherein said housing comprises:

a back plate;

a front cover attachable to said back plate; and said operational mechanism comprises a latch mechanism releasably securing said front cover to said back plate, wherein said latch mechanism only releases said front cover from said back plate if said matching code matches said identification code.

23. The system according to claim 22, further comprising;

a key controller carried by said key;

said communication system comprising a dispenser controller; and a dispenser memory device for storing said identification code, said dispenser controller obtaining said matching code from said key controller, and said identification code from said dispenser memory device to determine if said codes match one another.

24. The system according to claim 23, further comprising:

a key count value stored by said key controller, said key controller adjusting a said key count value after each successful matching of said matching code with said identification code.

25. The system according to claim 24, wherein said dispenser controller disables said pump actuator if said key count value is equal to a predetermined value.

26. The system according to claim 24, further comprising:

a dispenser display for displaying said count value.

27. The system according to claim 22, wherein said latching mechanism comprises:

a latch carriage;

a motor having a rotatable shaft;

a latch arm fixed to said rotatable shaft;

an extension extending from said back plate, wherein said latch arm engages said extension and wherein said latch arm rotates away from said extension when said matching code matches said identification code so as to allow opening of said front cover from said back plate.

28. The system according to claim 22, wherein said latching mechanism comprises:

a slide bar having an arm end opposite a cam end;

said front cover having a cover arm with an arm hole therethrough, said arm end slidably received therein;

a motor having a rotatable shaft;

a cam fixed to said rotatable shaft and engaging said cam end, wherein said cam disengages said arm end from said arm end from said cover arm when said matching code matches said identification code so as to allow opening of said front cover from said back plate.

29. The system according to claim 1, further comprising:

a key for carrying said matching code;

said housing having a key port for receiving said key; and a communication system coupled to said key when received in said key port.

30. The system according to claim 29, further comprising;

a key controller carried by said key;

said communication system comprising a dispenser controller; and a dispenser memory device for storing said identification code, said dispenser controller obtaining said matching code from said key controller, and said identification code from said dispenser memory device to determine if said codes match one another.

31. The system according to claim 30, further comprising:

a key count value stored by said key controller, said key controller adjusting a said key count value after each successful matching of said matching code with said identification code.

32. The system according to claim 31, wherein said dispenser controller disables said pump actuator if said key count value is equal to a predetermined value.

33. A method for installing a refill container and enabling a receiving dispenser, comprising:

associating a first data communication device with a housing;

storing an identification code in said first data communication device;

associating a second data communication device with a refill container which is receivable in said housing;

storing a matching code in said second data communication device;

associating an operational mechanism with one of said housing and said refill container;

coupling a pump mechanism with a nozzle to said refill container, said pump mechanism dispensing a measured quantity of material from said refill container through said nozzle;

proximally positioning a pump actuator near said pump mechanism;

controlling communications between said first and second data communication devices; and selectively enabling said operational mechanism as a result of said controlling step, by disabling said pump actuator if said codes do not match each other.

34. The method according to claim 33, further comprising:

coupling a motor to said pump actuator; and disabling said motor if said codes do not match one another.

35. The method according to claim 33, further comprising:

coupling an actuator bar to said pump actuator; and blocking said actuator bar if said codes do not match one another.

36. The method according to claim 33, further comprising:

carrying a detector/lockout assembly in said housing, said assembly having a rotatable pushbar lockarm; and moving said rotatable pushbar lockarm to a blocking position if said codes do not match one another.

37. The method according to claim 36, further comprising:

providing a key having a power supply;

providing a key port in said housing;

receiving said key in said key port; and providing power from said power supply to said detector/lockout assembly.

38. The method according to claim 37 further comprising:

recharging said power supply.

39. The method according to claim 37 further comprising:

providing a battery port in said key for the recharging step.

40. The method according to claim 33, further comprising:

attaching a tag to said refill container;

storing said matching code in said tag;

providing a communication system carried by said housing, said communication system comprising a dispenser controller, and a code detector and a dispenser memory device;

storing said identification code in said dispenser memory device;

detecting said tag and receiving said matching code in said dispenser controller; and accessing said dispenser memory device to obtain said identification code for said controlling step.

41. The method according to claim 33, further comprising:

attaching a bar code to said refill container, said bar code carrying said matching code;

providing a communication system carried by said housing, said communication system comprising a dispenser controller, and a code detector and a dispenser memory device;

storing said identification code in said dispenser memory device;

detecting said bar code and receiving said matching code in said dispenser controller; and accessing said dispenser memory device to obtain said identification code for said controlling step.

42. The method according to claim 33, further comprising:

providing a key for carrying said matching code;

providing a key port in said housing; and inserting said key into said key port to enable said controlling step.

43. The method according to claim 42, further comprising:

coupling a pump mechanism with a nozzle to said refill container; and positioning a pump actuator proximally said pump mechanism; and disabling said pump actuator if said codes do not match one another.

44. The method according to claim 42, further comprising:

coupling an actuator bar to said pump actuator; and blocking said actuator bar if said codes do not match.

45. The method according to claim 44, further comprising:

providing a key controller in said key;

providing a communication system carried by said housing, said communication system comprising a dispenser controller, and a dispenser memory device;

storing said identification code in said dispenser memory device; and communicating between said key controller and said dispenser controller to determine if said codes match one another.

46. The method according to claim 45, further comprising:

storing a key count value in said key controller; and adjusting said key count value after each successful matching of said matching code and said identification code.

47. The method according to claim 46, further comprising:

disabling said dispenser controller if said key count value equals a predetermined value.

48. The method according to claim 44, further comprising:

carrying a detector/lockout assembly in said housing, said detector lockout assembly comprising a lockout motor having a rotatable shaft and a pushbar lockarm fixed to said shaft; and rotating said shaft and said pushbar lockarm into a locking position if said codes do not match one another.

49. The method according to claim 46, further comprising:

displaying said count value.

50. The method according to claim 43, further comprising:

coupling an actuator motor to said pump actuator; and disabling said actuator motor if said codes do not match one another.

51. The method according to claim 50, further comprising:

providing a key controller in said key;

providing a communication system carried by said housing, said communication system comprising a dispenser controller, and a dispenser memory device;

storing said identification code in said dispenser memory device; and communicating between said key controller and said dispenser controller to determine if said codes match one another.

52. The method according to claim 51, further comprising:

storing a key count value in said key controller; and adjusting said key count value after each successful matching of said matching code and said identification code.

53. The method according to claim 52, further comprising:

disabling said dispenser controller if said key count value equals a predetermined value.

54. The method according to claim 42, further comprising:

providing said housing with a back plate, and a front cover attachable to said back plate;

releasably securing said front cover and said back plate with a latch mechanism; and releasing said latching mechanism only if said codes match one another.

55. The method according to claim 54, further comprising:

providing a key controller in said key;

providing a communication system carried by said housing, said communication system comprising a dispenser controller, and a dispenser memory device;

storing said identification code in said dispenser memory device; and communicating between said key controller and said dispenser controller to determine if said codes match one another.

56. The method according to claim 55, further comprising:

storing a key count value in said key controller; and adjusting said key count value after each successful matching of said matching code and said identification code.

57. The method according to claim 56, further comprising:

disabling said dispenser controller if said key count value equals a predetermined value.

58. The method according to claim 54, further comprising:

providing said latch mechanism with a latch carriage, a motor having a rotatable shaft, a latch arm fixed to said rotatable shaft, and an extension extending from said back plate;

engaging said extension with said latch arm;

comparing said codes; and rotating said latch arm away from said extension if said codes match.

59. The method according to claim 54, further comprising:

providing said latch mechanism with a slide bar having an arm end opposite a cam end, wherein said front cover has a cover arm with an arm hole therethrough, a motor having a rotatable shaft, a cam fixed to said rotatable shaft and engaging said cam end;

comparing said codes; and rotating said cam and disengaging said arm end from said arm hole if said codes match.

60. The method according to claim 33, further comprising:

carrying said matching code in a key; and receiving said key in said housing prior to said controlling step.

61. The method according to claim 60, further comprising:

providing a key controller in said key;

providing a communication system carried by said fluid dispenser, said communication system comprising a dispenser controller, and a dispenser memory device;

storing said identification code in said dispenser memory device; and communicating between said key controller and said dispenser controller to determine if said codes match one another.

62. The method according to claim 61, further comprising:

storing a key count value in said key controller; and adjusting said key count value after each successful matching of said matching code and said identification code.

63. The method according to claim 56 further comprising:

disabling said dispenser controller if said key count value equals a predetermined value.

* * * * *

UNITED STATES PATENT AND TRADEMARK OFFICE

CERTIFICATE OF CORRECTION

PATENT NO. : 7,028,861 B2
APPLICATION NO. : 10/737869
DATED : April 18, 2006
INVENTOR(S) : Sayers et al.

It is certified that error appears in the above-identified patent and that said Letters Patent is hereby corrected as shown below:

Claim 1, column 16, line 6 should read --therewith, -- not “therewith;”

Claim 1, column 16, line 9 should read --housing;-- not “housing”

Claim 1, column 16, line 14 should read --container,-- not “container”

Signed and Sealed this

Twenty-seventh Day of November, 2007

JON W. DUDAS

*Director of the United States Patent and Trademark Office*